US012586584B1

(12) United States Patent
Bueche et al.

(10) Patent No.: US 12,586,584 B1
(45) Date of Patent: **\*Mar. 24, 2026**

(54) SELECTING TONES AND TEXT OF VOICE BROWSING CONVERSATIONS

(71) Applicant: Amazon Technologies, Inc., Seattle, WA (US)

(72) Inventors: Edward Bueche, Pleasanton, CA (US); Amaury Gutierrez Acosta, San Francisco, CA (US); Francois Mairesse, Berkeley, CA (US); Yun Suk Paik, San Mateo, CA (US); Anmol Tiwari, Seattle, WA (US); Tao Ye, Millbrae, CA (US)

(73) Assignee: Amazon Technologies, Inc., Seattle, WA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/624,538

(22) Filed: Apr. 2, 2024

Related U.S. Application Data

(63) Continuation of application No. 17/217,994, filed on Mar. 30, 2021, now Pat. No. 11,978,445.

(51) Int. Cl.
     *G10L 15/22* (2006.01)
(52) U.S. Cl.
     CPC ................................... *G10L 15/22* (2013.01)
(58) Field of Classification Search
     None
     See application file for complete search history.

(56) References Cited

U.S. PATENT DOCUMENTS

| | | | | |
|---|---|---|---|---|
| 5,987,415 | A * | 11/1999 | Breese | H04N 21/466 |
| | | | | 704/275 |
| 9,129,602 | B1 * | 9/2015 | Shepard | G10L 21/013 |
| 9,679,568 | B1 * | 6/2017 | Taubman | G06F 16/9535 |
| 10,127,908 | B1 | 11/2018 | Deller et al. | |
| 10,360,265 | B1 * | 7/2019 | Agarwal | G10L 15/1815 |
| 10,388,274 | B1 * | 8/2019 | Hoffmeister | G06N 3/047 |
| 10,614,800 | B1 | 4/2020 | McMahon et al. | |
| 10,789,944 | B2 | 9/2020 | Kumaran et al. | |
| 10,839,159 | B2 | 11/2020 | Yang et al. | |
| 10,885,091 | B1 | 1/2021 | Meng et al. | |
| 10,984,780 | B2 | 4/2021 | Bellegarda | |
| 10,992,764 | B1 | 4/2021 | Esmaeili et al. | |
| 11,012,575 | B1 | 5/2021 | Leblang et al. | |
| 11,204,787 | B2 | 12/2021 | Radebaugh et al. | |
| 11,587,567 | B2 * | 2/2023 | Carmeli | H04L 51/02 |

(Continued)

*Primary Examiner* — Jonathan C Kim
(74) *Attorney, Agent, or Firm* — Athorus, PLLC

(57) ABSTRACT

Dialog acts (e.g., questions) are selected for voice browsing by a model trained to identify a dialog act that is most likely to lead to a desired outcome. Upon receiving an invocation to begin a conversation, a score indicative of a level of confidence that the conversation will have a successful outcome is determined, and a dialog act is selected based on the score. Subsequently, at each turn of the conversation, the score is updated or a new score is calculated, and a dialog act is selected based on the updated or new score. Confidence scores are calculated based on input features that are determined based on the user who uttered the invocation or responses to dialog acts, as well as a context of the conversation, and provided to a linear model or a machine learning model as inputs.

20 Claims, 20 Drawing Sheets

(56)        References Cited

U.S. PATENT DOCUMENTS

| | | | |
|---|---|---|---|
| 11,727,217 B2 * | 8/2023 | Ben-Kiki | G06F 40/30 |
| | | | 709/204 |
| 12,087,284 B1 * | 9/2024 | Lezzoum | G06F 3/165 |
| 2016/0086597 A1 * | 3/2016 | Matsubara | G10L 13/0335 |
| | | | 704/243 |
| 2017/0102915 A1 * | 4/2017 | Kuscher | G06F 16/9574 |
| 2017/0337199 A1 | 11/2017 | Kogan et al. | |
| 2017/0364519 A1 | 12/2017 | Beller et al. | |
| 2018/0061393 A1 * | 3/2018 | Osotio | G10L 13/0335 |
| 2018/0114531 A1 * | 4/2018 | Kumar | G10L 15/22 |
| 2018/0232435 A1 * | 8/2018 | Papangelis | G06N 3/092 |
| 2018/0294001 A1 * | 10/2018 | Kayama | G10L 15/02 |
| 2018/0315415 A1 * | 11/2018 | Mosley | G10L 15/063 |
| 2018/0322131 A1 | 11/2018 | Haviv et al. | |
| 2018/0329998 A1 * | 11/2018 | Thomson | H04N 21/42203 |
| 2018/0330721 A1 * | 11/2018 | Thomson | G10L 15/1822 |
| 2019/0103127 A1 * | 4/2019 | Tseretopoulos | G10L 15/187 |
| 2019/0115027 A1 * | 4/2019 | Shah | G10L 17/22 |
| 2019/0130904 A1 * | 5/2019 | Homma | G10L 15/22 |
| 2019/0266999 A1 * | 8/2019 | Chandrasekaran | G06F 3/167 |
| 2019/0311718 A1 * | 10/2019 | Huber | G10L 15/22 |
| 2019/0318724 A1 * | 10/2019 | Chao | G10L 15/30 |
| 2019/0371303 A1 | 12/2019 | Kumaran et al. | |
| 2020/0043485 A1 * | 2/2020 | Tonetti | G10L 15/22 |
| 2020/0082829 A1 * | 3/2020 | Taubman | G10L 15/30 |
| 2020/0105273 A1 * | 4/2020 | O'Donovan | G10L 15/30 |
| 2020/0184959 A1 | 6/2020 | Yasa et al. | |
| 2020/0279551 A1 * | 9/2020 | Sung | G10L 25/63 |
| 2020/0333875 A1 * | 10/2020 | Bansal | G06F 9/3836 |
| 2021/0019357 A1 | 1/2021 | Bennett et al. | |
| 2021/0042657 A1 | 2/2021 | Tiruveedhula | |
| 2021/0049996 A1 * | 2/2021 | Chae | G06N 20/00 |
| 2021/0082420 A1 * | 3/2021 | Kraljic | G10L 15/1815 |
| 2021/0104220 A1 * | 4/2021 | Mennicken | G06F 3/165 |
| 2021/0110821 A1 | 4/2021 | Lim et al. | |
| 2021/0142791 A1 | 5/2021 | Penta et al. | |
| 2021/0326756 A1 | 10/2021 | Khaleghi et al. | |
| 2021/0357172 A1 * | 11/2021 | Sinesio | G06F 16/48 |
| 2022/0107979 A1 | 4/2022 | Coope et al. | |
| 2022/0148580 A1 * | 5/2022 | Kumar | G06F 18/29 |
| 2022/0262348 A1 | 8/2022 | Shinde | |
| 2023/0245651 A1 * | 8/2023 | Wang | G06N 5/022 |
| | | | 704/275 |

* cited by examiner

SELECT DIALOG ACT BASED ON CONVERSATIONAL CONFIDENCE
SCORE CALCULATED BY MODEL

CONVERSATIONAL CONFIDENCE SCORE CS(t)

SUCCESS

BASELINE

FAILURE

SELECTING TONES AND TEXT OF VOICE BROWSING CONVERSATIONS

PRIORITY CLAIM

This application is a Continuation of U.S. patent application Ser. No. 17/217,994, filed on Mar. 30, 2021, and titled "Confidence Scoring For Selecting Tones And Text Of Voice Browsing Conversations," the contents of which are incorporated by reference herein.

BACKGROUND

Voice browsing is a process by which users request information not by strokes of a keyboard, or by gestures with a mouse or touchscreen, but with one or more utterances that are spoken aloud to a computer system operating a conversational agent. A voice browser is a system or a process that presents an interactive voice interface to a user by spoken words and other sounds, e.g., a vocal equivalent of a web browser, and engages a user in a conversation in pursuit of a goal. Information that may be requested by voice browsing is limited only by a number or type of input/output devices that are provided on a voice browsing system or available to a voice browsing process. During a voice browsing experience, audio information may be presented to a user via a speaker, and visual information may be presented to the user on a display.

Voice browsing experiences provide users with a number of advantages over traditional browsing experiences which require manual operation of an input/output device. For example, voice browsing experiences enable users to receive information regarding desired items or content in a hands-free manner, and in any number of environments. Conversations with voice browsing systems or processes are limited, however, in that most voice browsing systems or processes are presently unable to determine a mood of a user (or a mood of a conversation with the user), or assess a likelihood that a conversation will accomplish a goal or otherwise result in a successful outcome, based on utterances received from the user. Nor may such systems or processes presently select one or more words or a tone of a dialog act to be presented to the user based a mood of the user, or a likelihood that a conversation will achieve a goal of the user or otherwise result in a successful outcome.

The selection of dialog acts, or questions, presented to a user of the computer system, or an order in which such dialog acts or questions are presented, may be critically important in assisting the user in this endeavor. In this regard, while voice browsing experiences can currently improve upon many aspects of conversations between humans, some voice browsing systems or processes may cause a user to abandon or abort the goal, or to otherwise experience an unacceptably low level of satisfaction, by failing to accurately gauge a mood of a conversation or to recognize and respond when the conversation is running at risk of missing its target.

BRIEF DESCRIPTION OF THE DRAWINGS

FIGS. 4A through 4F are views of aspects of one system for scoring conversational confidence in accordance with implementations of the present disclosure.

DETAILED DESCRIPTION

As is set forth in greater detail below, the present disclosure is directed to confidence scoring for selecting tones, text or other acts in voice browsing conversations. More specifically, the systems and methods that calculate a score indicative of how well or how poorly a conversation in a voice browsing experience is advancing toward a goal of a user, and adjusting text or tones of dialog acts returned to the user, or selecting one or more parameters or attributes of auxiliary acts to be presented to the user, accordingly based on such scores. When a user initiates a conversation in a voice browsing experience, such as by providing an utterance or invocation to a computer system, which may include but need not be limited to a smart speaker, a mobile device or an automobile, one or more input features are identified from the utterance or invocation, or based on any information that may be known regarding the user or the computer system. The input features may include or be identified based on words included in the utterances or invocation, as well as whether any of such words have a negative context or connotation, and any other factors.

The input features are provided to a model, e.g., a linear model, such as a linear regression model, or a machine learning model, that returns a confidence score (or a goal success estimate) indicative of a level of confidence that the conversation will achieve a goal of the user, or will otherwise have a successful outcome. Once a confidence score has been calculated, a set of text or a tone for a dialog act, or parameters of an auxiliary act to accompany the dialog act, may be selected based on the confidence score. Data for presenting the dialog act and the auxiliary act is transmitted to the computer system that captured the utterance or invocation. Subsequently, when the user provides feedback in response to the dialog act or the auxiliary act, one or more input features may be identified or updated based on the feedback received from the user, and additional or updated input features may be provided to the model to calculate an updated confidence score, which may indicate a change in a mood of the user, or of the conversation, thereby causing a change in a level of confidence that the conversation will achieve the goal or otherwise end successfully. Text or tones of dialog acts that are to be presented to a user, or parameters of auxiliary acts, may be selected based on confidence scores, which may be recalculated based on responses received from the user, at every turn of a conversation until the conversation is concluded.

Figure 1A:
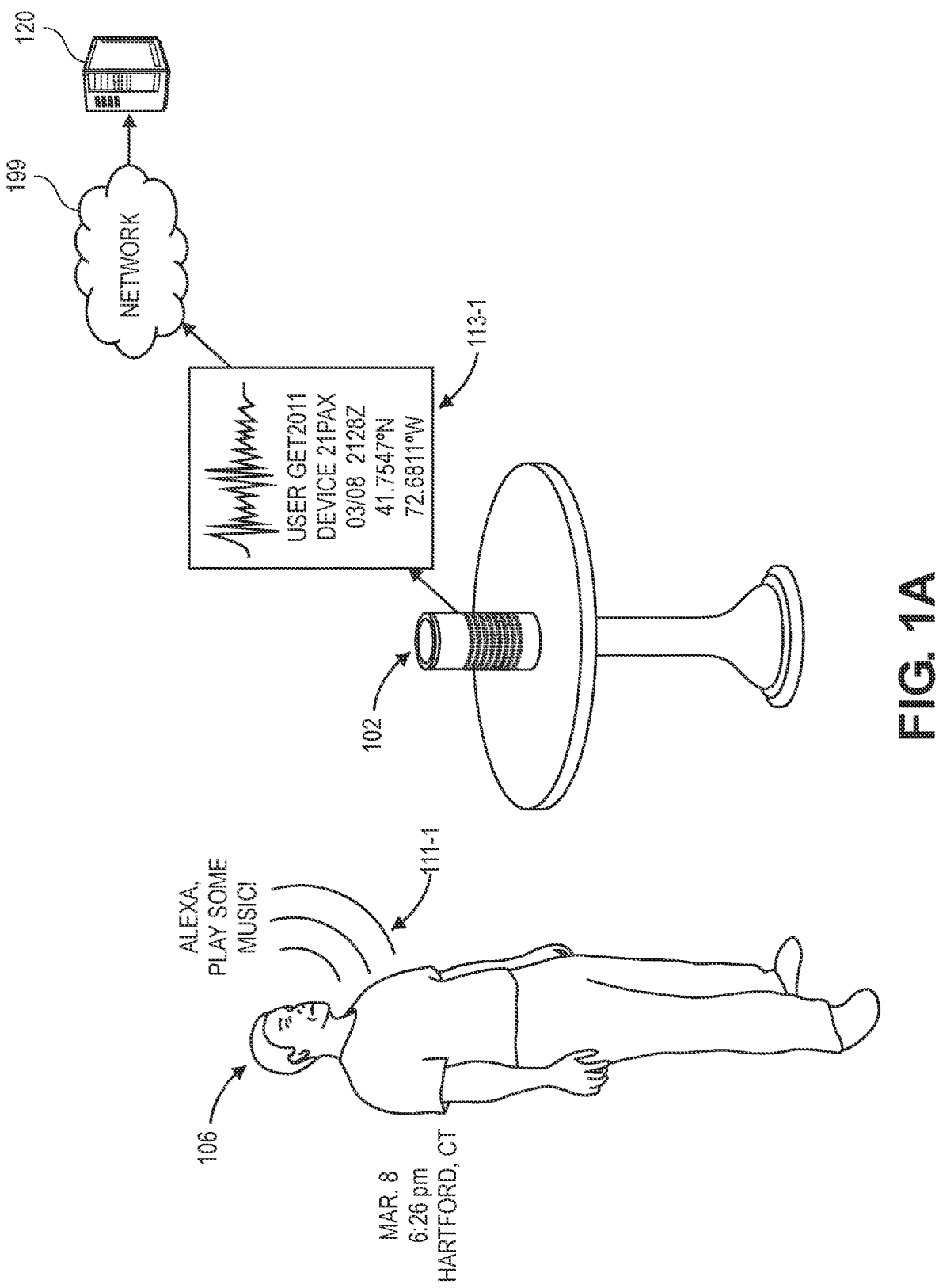
FIGS. 1A through 1G are views of aspects of one system for scoring conversational confidence in accordance with implementations of the present disclosure.

Referring to FIGS. 1A through 1G, views of aspects of one system for scoring conversational confidence in accordance with implementations of the present disclosure are shown. As is shown in FIG. 1A, a user 106 of a smart speaker (or a mobile device, an automobile, or any other computer device) 102 provides an utterance 111-1, viz., "Alexa, play some music!" to the smart speaker 102. Upon receiving audio signals including the utterance 111-1, the smart speaker 102 may process the audio signals to determine whether such signals include a "wake word," or a predetermined word or set of words (e.g., a phrase) that, when recognized within audio data captured by the smart speaker 102, activates the smart speaker 102 and causes the smart speaker 102 to execute one or more applications or functions based on other aspects of the audio signals. After confirming that a wake word is detected in the audio signals, the smart speaker 102 processes such signals and any other information or data that may be known, predicted or determined regarding the user 106 or the utterance 111-1, or conditions under which the utterance 111-1 was provided by the user 106.

The smart speaker 102 then transmits data 113-1 including the audio signals or any other descriptors of the utterance 111-1 to a server 120 (or any other computer device) over a network 199, for processing or interpretation of any speech included therein. The network 199 may include the Internet, in whole or in part. The data 113-1 may include a time or a date at which the utterance 111-1 was provided by the user 106, a location of the smart speaker 102, or any characteristics of the utterance 111-1, including but not limited to frequencies or wavelengths of the words included therein, a rate of speech of the user 106, a number of arguments or other terms included in the utterance 111-1, or any other attributes of the utterance 111-1, the user 106 or the smart speaker 102. Upon receiving the data 113-1, the server 120 may execute one or more speech recognition modules for recognizing and interpreting the utterance 111-1 within the data 113-1. For example, portions of the data 113-1 may be compared with portions of sounds (e.g., sub-word units or phonemes) or sequences of such sounds to identify words of the utterance 111-1, including but not limited to a wake word, and to recognize any commands, viz., a request for music, expressed within the utterance 111-1.

Figure 1B:
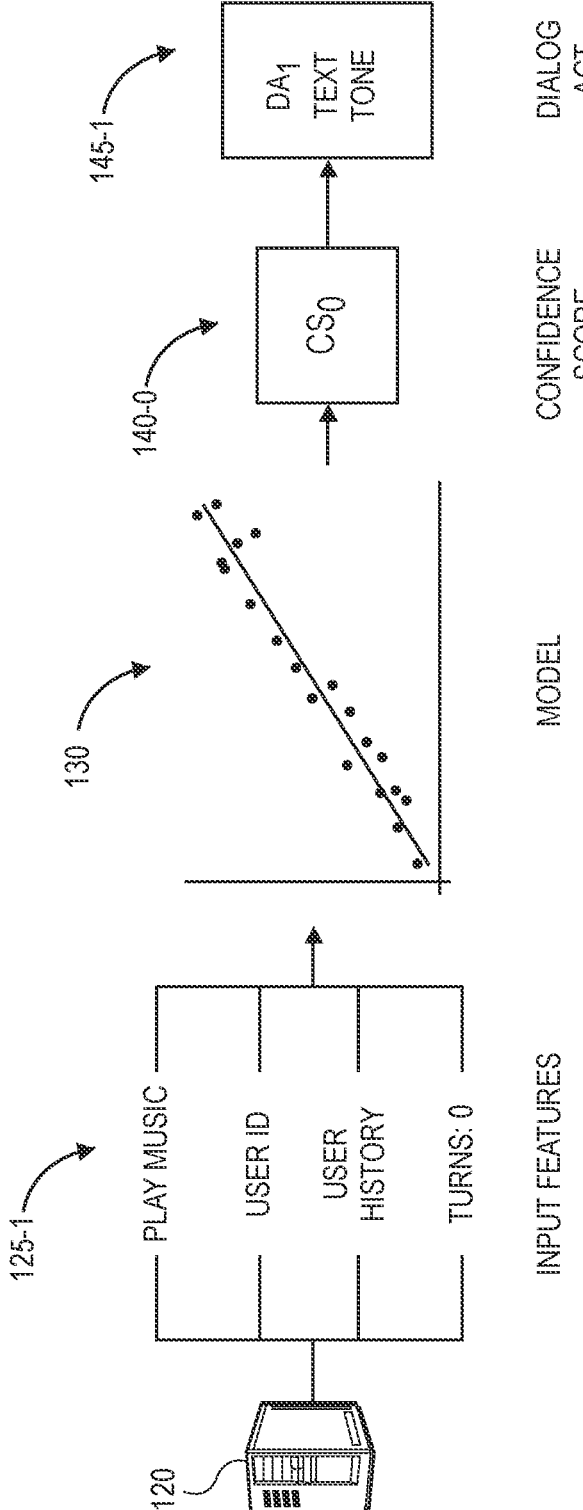

As is shown in FIG. 1B, upon receiving the data 113-1, the server 120 may process the data 113-1 to generate a set of input features 125-1 (e.g., metadata) regarding the utterance 111-1, the user 106 or the smart speaker 102. In some implementations, the input features 125-1 may include variables or values that represent one or more attributes of the utterance 111-1, including an interpretation of the text of the utterance 111-1 (e.g., a command to play music), an identifier of the user 106, a history of utterances received from the user 106, as well as a number of turns of the conversation so far, viz., zero. The set of input features 125-1 is provided to a model 130 that is trained to output or otherwise calculate a confidence score (or a goal success estimate) 140-0, or $CS_0$, that is indicative of a mood of the user 106, or the conversation, or representative of a likelihood that the conversation will advance toward a goal, e.g., the identification of media or other content (or one or more items) preferred by the user 106. The model 130 may be a linear model, such as a linear regression model, or a machine learning model, or any other model. For example, the model 130 may express a relationship between a set of observed values and a set of regressors or other input variables, and may include any number of weights or coefficients applied to any of such regressors.

Based on the confidence score 140-0, or $CS_0$, a set of text and/or a tone of a dialog act 145-1, or $DA_1$, to be presented to the user 106 are selected. The text or the tone of the dialog act 145-1 may be selected to most closely align with a mood of the user 106, or to appropriately respond to or address one or more words of the utterance 111-1, which may be negative or adverse in nature. In some implementations, the confidence score 140-0 may be a baseline confidence score, having a value of 100, or another nominal value, that is selected as the initial confidence score for the invocation, independent of the model 130. In some implementations, such as where the smart speaker 102 is outfitted or configured with displays, lights, haptic feedback features or other output devices, parameters of an auxiliary act to accompany the dialog act 145-1 may be selected based on the confidence score 140-0. For example, where the smart speaker 102 is outfitted or configured with a display, one or more images or other visible features may be selected based on the confidence score 140-0, and shown on the display at approximately the same time that the dialog act 145-1 is presented to the user 106. As another example, where the smart speaker 102 is outfitted or configured with one or more lights, e.g., LED lights, one or more of such lights or patterns, or frequencies, wavelengths, colors or other attributes of light to be emitted therefrom at specific times, or at approximately the same time that the dialog act 145-1 is presented to the user 106, may be selected based on the confidence score 140-0. Alternatively, an auxiliary act may be presented to the user 106 by any other device or system associated with the user 106, e.g., a mobile device (not shown) of the user 106, which may receive data for presenting the auxiliary act from the server 120 over the network 199.

Figure 1C:
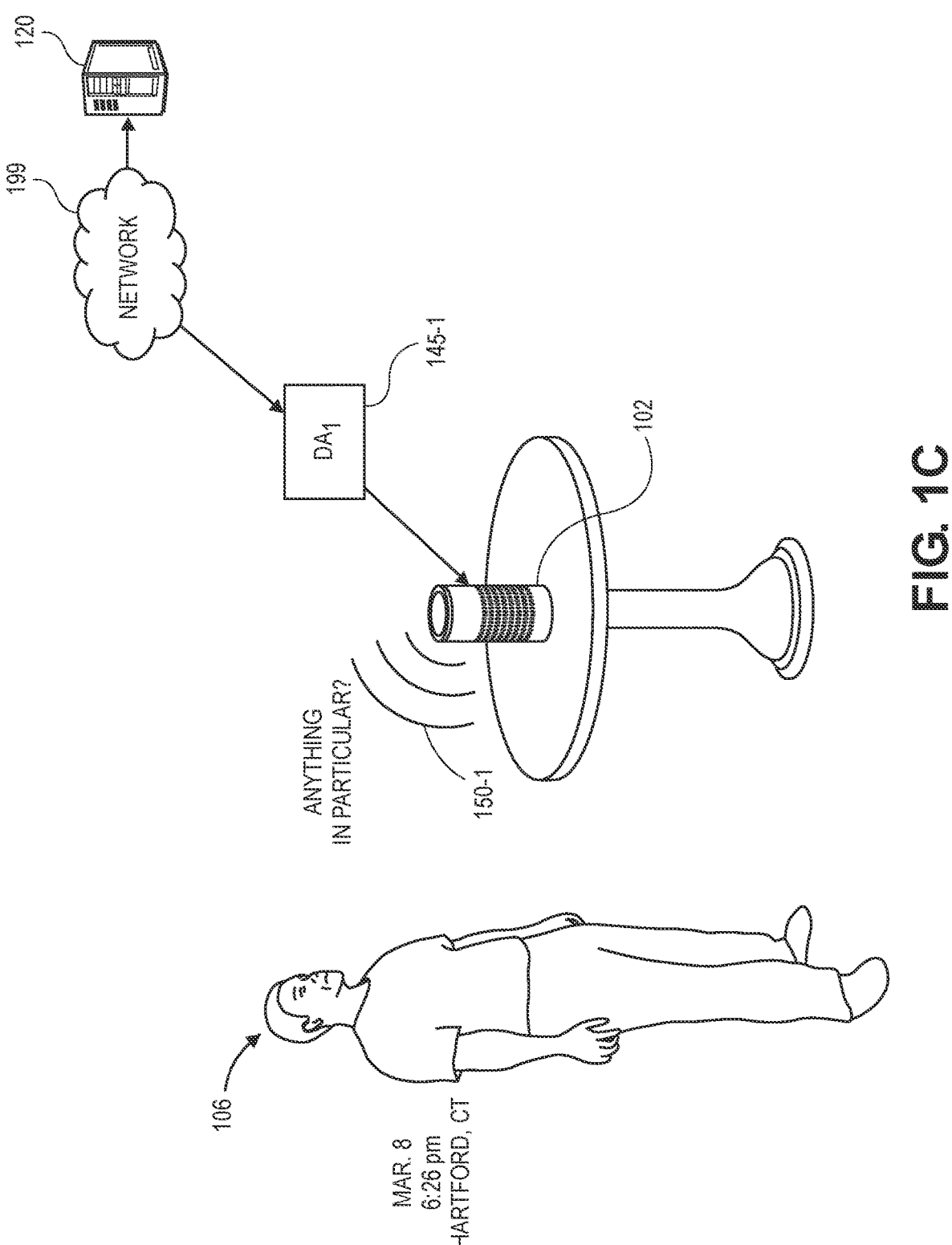
Figure 1D:
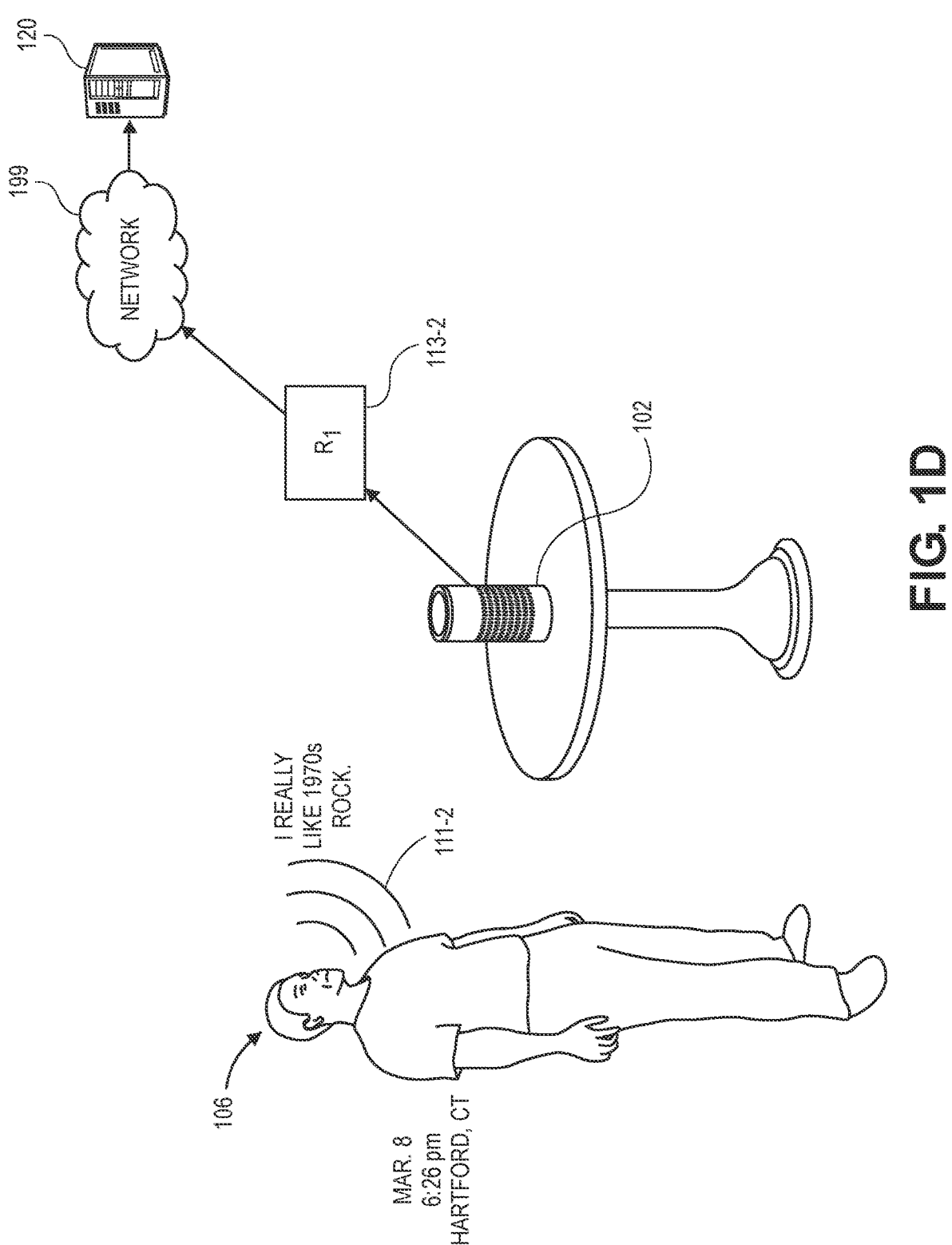

As is shown in FIG. 1C, the server 120 transmits data for causing the smart speaker 102 to present the dialog act 145-1, e.g., "Anything in particular?" to the user 106. Upon receiving the data, the smart speaker 102 presents one or more audio signals 150-1 corresponding to the dialog act 145-1. As is shown in FIG. 1D, in response to the dialog act 145-1, the user 106 provides an utterance 111-2, viz., "I really like 1970s rock," to the smart speaker 102. Upon capturing audio signals including the utterance 111-2, the smart speaker 102 transmits data 113-2 including the audio signals or any other descriptors of the utterance 111-2 to the server 120 for processing or interpretation. The data 113-2 may include any characteristics of the utterance 111-2, e.g., frequencies or wavelengths, a rate of speech, a number of arguments or other terms, or any other attributes of the utterance 111-2, the user 106 or the smart speaker 102. In some implementations, the data 113-2 may include one or more parameters of an auxiliary act that is to be presented to the user 106 at the same time as the dialog act 145-1. For example, where the smart speaker 102 is outfitted or configured with a display or another output device, the data 113-2 may include one or more images, lights or other visible features to be shown on the display, at approximately the same time that the dialog act 145-1 is presented to the user 106.

Figure 1E:
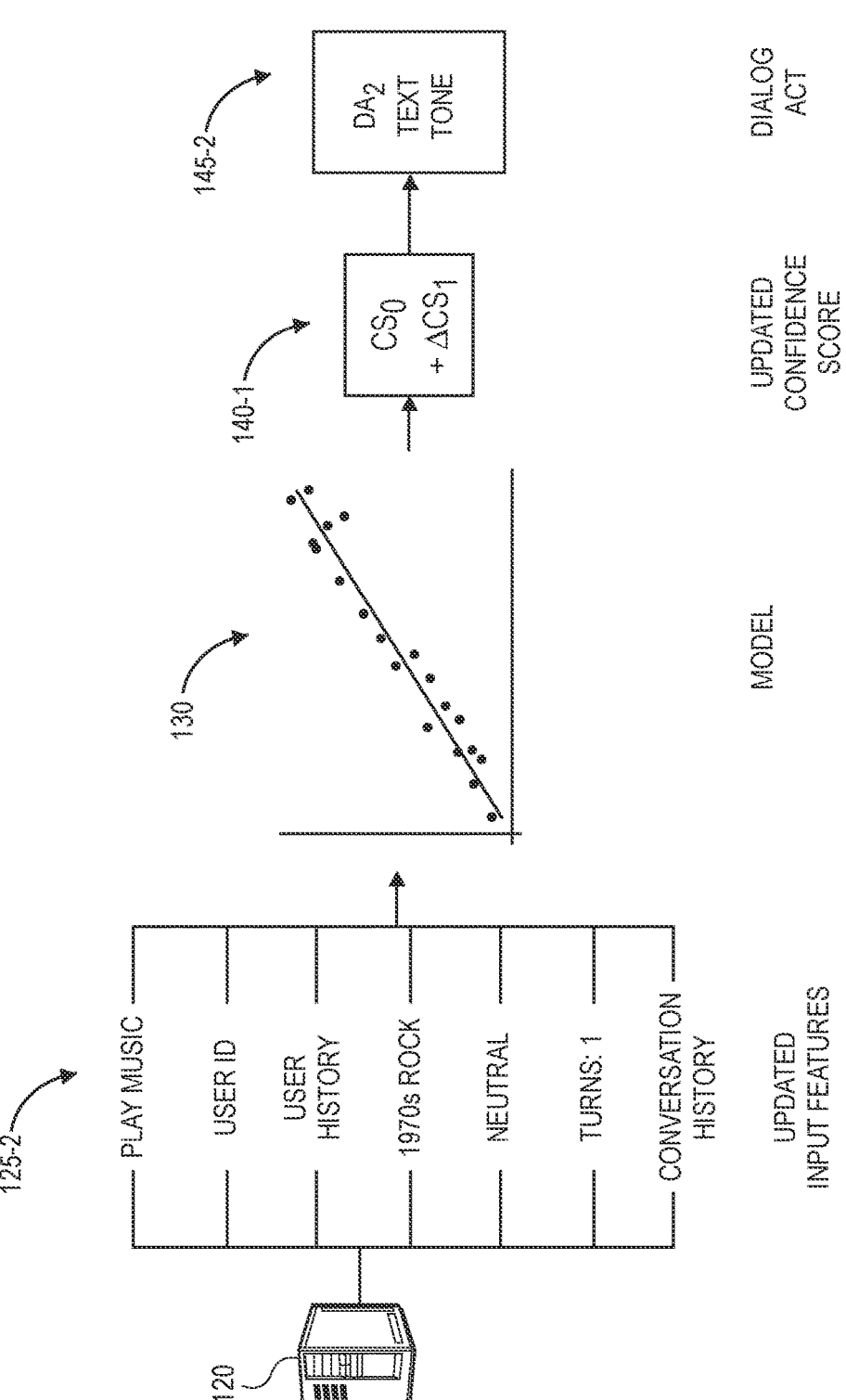

As is shown in FIG. 1E, upon receiving the data 113-2, the server 120 may process the data 113-2 to generate an updated set of input features 125-2 regarding the utterance 111-2, the user 106, the smart speaker 102 or the conversation. For example, the set of input features 125-2 may include an interpretation of the text of the utterance 111-2 (e.g., an identification of a genre or an era of music), the identifier of the user 106, a history of utterances received from the user 106, viz., the utterances 111-1, 111-2. The set of input features 125-2 may further include a number of turns of the conversation so far, viz., one, as well as a history of the conversation, which may include or identify features of the utterances 111-1, 111-2 or the dialog acts or auxiliary acts previously presented to the user 106. In some implementations, the set of input features 125-2 may be generated in its entirety upon receiving the data 113-2, e.g., independent of the set of input features 125-1. In some other implementations, the set of input features 125-2 may include one or more input features other than the input features of the set 125-1, or may include revisions to any of the input features of the set 125-1.

The set of input features 125-2 is provided to the model 130, and a confidence score 140-1, or $CS_1$, indicative of a mood of the user 106, or the conversation, or representative of a likelihood that the conversation will advance toward the goal, is updated in view of the utterance 111-2. In some implementations, the confidence score 140-1 may be calculated independent of the confidence score 140-0. In some other implementations, the confidence score 140-1 may be calculated as an increase or a decrease over the confidence score 140-0, e.g., by an amount or by a percentage of the confidence score 140-0. Alternatively, the confidence score 140-1 may be calculated in any other manner, such as based on weights that are respectively applied to the set of input features 125-2.

Depending on the input features 125-2, a value of the confidence score 140-1 may be less than or greater than a value of the confidence score 140-0. In some implementations, the model 130 may be trained or configured to account for a duration of a conversation, and to degrade a value of a confidence score calculated thereby on account of conversational friction that may result from errors in processing utterances, recognizing words, or delays in arriving at an appropriate selection or outcome for the user.

Based on the confidence score 140-1, or $CS_1$, a set of text and/or a tone of another dialog act 145-2, or $DA_2$, to be presented to the user 106 are selected. The text or the tone of the dialog act 145-2 may be selected to reflect an improvement of or a deterioration in the mood of the user 106, or to appropriately respond to or address one or more words of the utterance 111-2, which may be negative or adverse in nature.

Figure 1F:
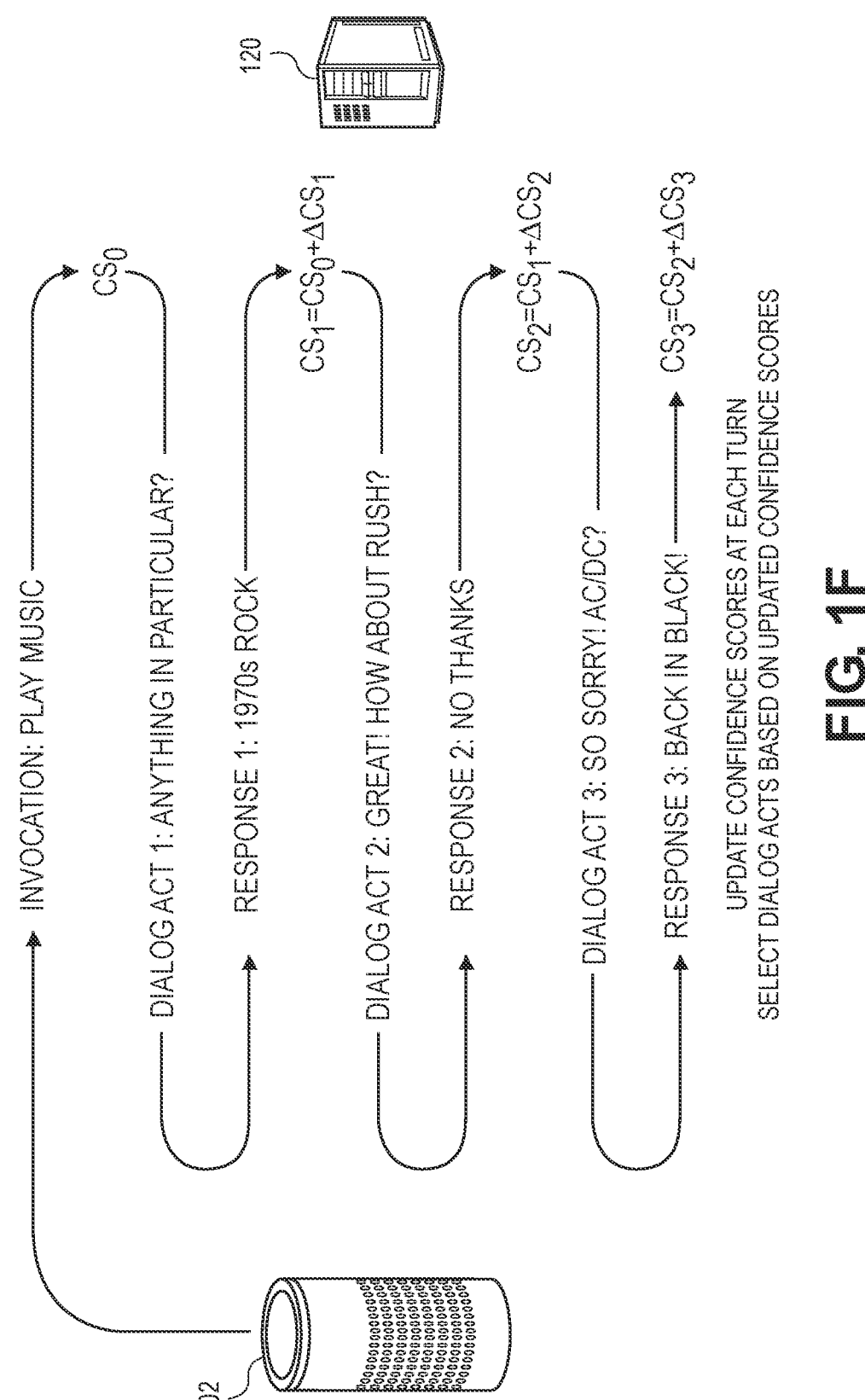

The processes by which confidence scores are calculated based on feedback received from the user 106, and used to select sets of text or tones of dialog acts to be presented to the user 106, may be repeated at each turn of a conversation between the user 106 and the smart speaker 102, as long as the conversation continues. For example, as is shown in FIG. 1F, the confidence score $CS_1$ may be calculated as a sum of the confidence score $CS_0$ and a change $\Delta CS_1$ calculated based on the response "1970s rock" received in reply to the dialog act 145-1. The dialog act 145-2, viz., "Great! How about Rush?" selected by the server 120 based on the confidence score $CS_1$ is presented to the user 106 by the smart speaker 102, and a response received from the user 106, viz., "no thanks," is received by the smart speaker 102. A confidence score $CS_2$ may be calculated as a sum of the confidence score $CS_1$ and a change $\Delta CS_2$ calculated based on the response "no thanks" received in reply to the dialog act 145-2, which may be interpreted as having a substantially negative connotation. A set of text and a tone of a dialog act 145-3, viz., "So sorry! AC/DC?" may be selected based on the confidence score $CS_2$, such as to address the substantially negative connotation of the response "no thanks."

As is further shown in FIG. 1F, a response to the dialog act 145-3, viz., "Back in Black!" is received by the smart speaker 102 from the user 106. A confidence score $CS_3$ may be calculated as a sum of the confidence score $CS_2$ and a change $\Delta CS_3$ calculated based on the response "Back in Black!" received in reply to the dialog act 145-3, which may be interpreted as having a substantially positive connotation.

Figure 1G:
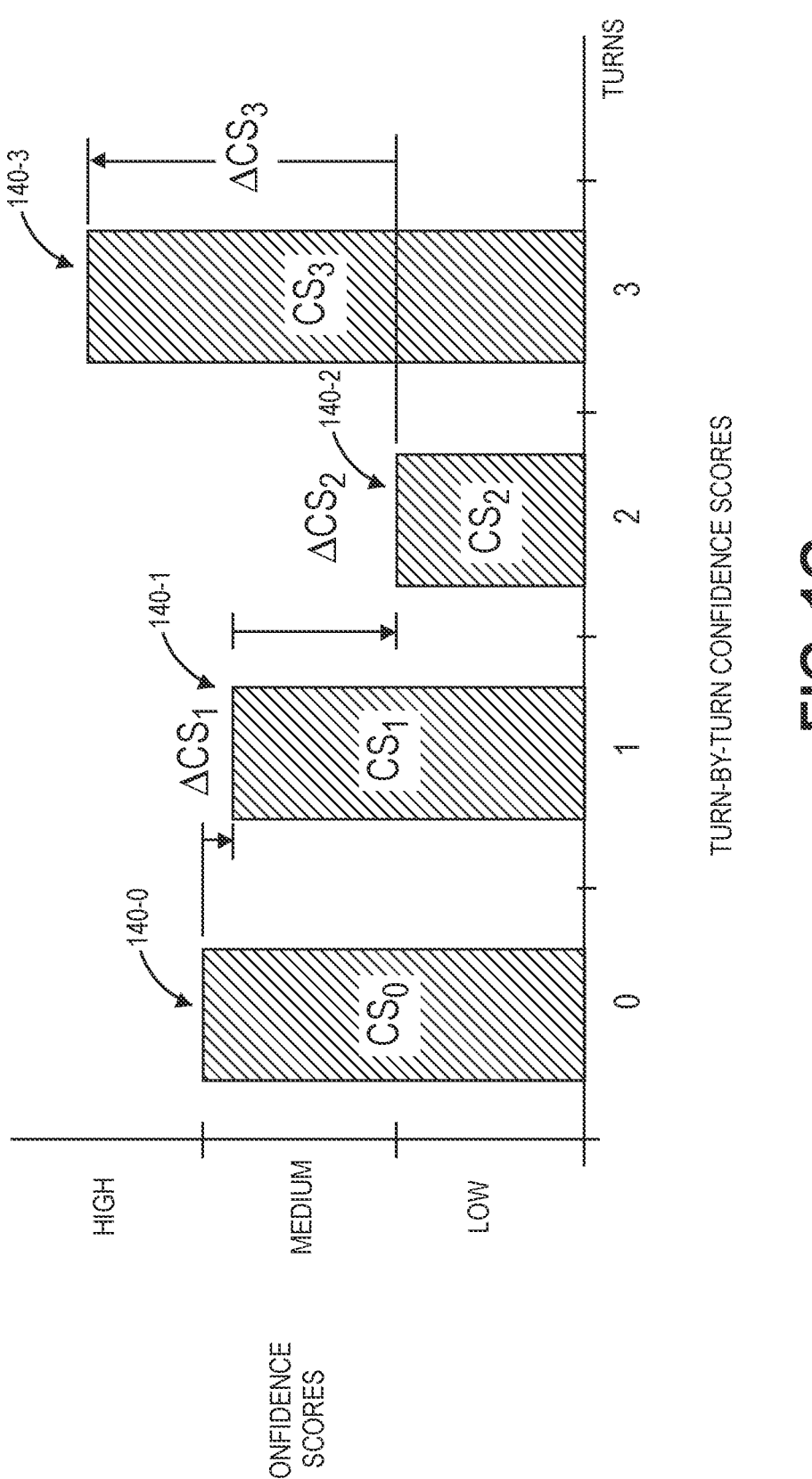

As is shown in FIG. 1G, a bar graph depicts values of the confidence scores 140-0, 140-1, 140-2, 140-3 calculated during the conversation between the user 106 and the smart speaker 102. The bar graph shows values of the confidence scores 140-0, 140-1, 140-2, 140-3 calculated through the turns of the conversation with respect to ranges, e.g., a high confidence, a medium confidence and a low confidence. In some implementations, when a confidence score is calculated, the confidence score may be mapped to one of the ranges, and a set of text or a tone of a dialog act, or an auxiliary act, may be selected based on the mapped range, e.g., a high confidence set of text or tone, a medium confidence set of text or tone, or a low confidence set of text or tone. Alternatively, the confidence scores may be mapped to any number of ranges, and need not be limited to three of such ranges, e.g., high, low or medium.

In some implementations, the confidence scores (or goal success estimates) may be calculated based on a baseline confidence score (or goal success estimate) at an outset of a conversation, such that each of the changes in the confidence scores may be reduced in value, or degraded, on account of conversational friction that may result from errors in processing utterances, recognizing words, or delays in arriving at an appropriate selection or outcome for the user. In such implementations, a confidence score may have its greatest value when a conversation begins, and may be reduced in value over time, such as where each of the change $\Delta CS_1$, the change $\Delta CS_2$ and the change $\Delta CS_3$ has a negative value. Alternatively, in some implementations, a confidence score may be calculated independently at every turn of a conversation, rather than based on a change from a previous score.

A voice browsing conversation is typically represented or modeled as a sequence of turns in a context, and responses provided by a user in each of the turns is used to refine an identified or predicted goal of the user, which may be represented as a set of one or more constraints. For example, where a user is interested in listening to music, a system operating a conversational agent may learn that the customer likes '90s hip hop but dislikes country, that the user prefers music with upbeat or energetic moods to laid back or depressed moods, or that the user is a fan of Adele but not a fan of Shania Twain. A system operating the conversational agent, or another system in communication with that system, may maintain a set of search results (e.g., candidate search results) that are consistent with such constraints, and in furtherance of that goal.

At each turn, the system may present a user with one or more dialog acts, or any accompanying auxiliary acts. For example, one dialog act may be to present a sample of media to a user, e.g., audio or visual media, and may be presented as a question with language such as, "You might like this," followed by the playing of the sample. Another dialog act may be to recommend one or more selected genres to the user, and may be presented as a question with language such as "How'd you like some techno?" Other dialog acts may involve a request for a confirmation of information identified in audio data previously received from the user, which may be presented as a question with language such as, "You'd like to hear Soundgarden, right?" or a request for additional information from the user, which may be presented as a question with language such as "Do you have anything in mind?" or "Can you think of a mood or tempo you'd prefer?" Still other dialog acts may involve a suggestion of a mood, which may be presented as a question with language such as "Feel like something chill? Or something peppy?" or a request to identify or describe other people who are present with or around the user, which may be presented as a question with language such as "Who are we hanging out with today? Friends? Family?" With each response received from the user, the system may determine whether to execute another dialog act, e.g., to ask another question, to begin playing a selected media file, or to take another action.

Figure 2:
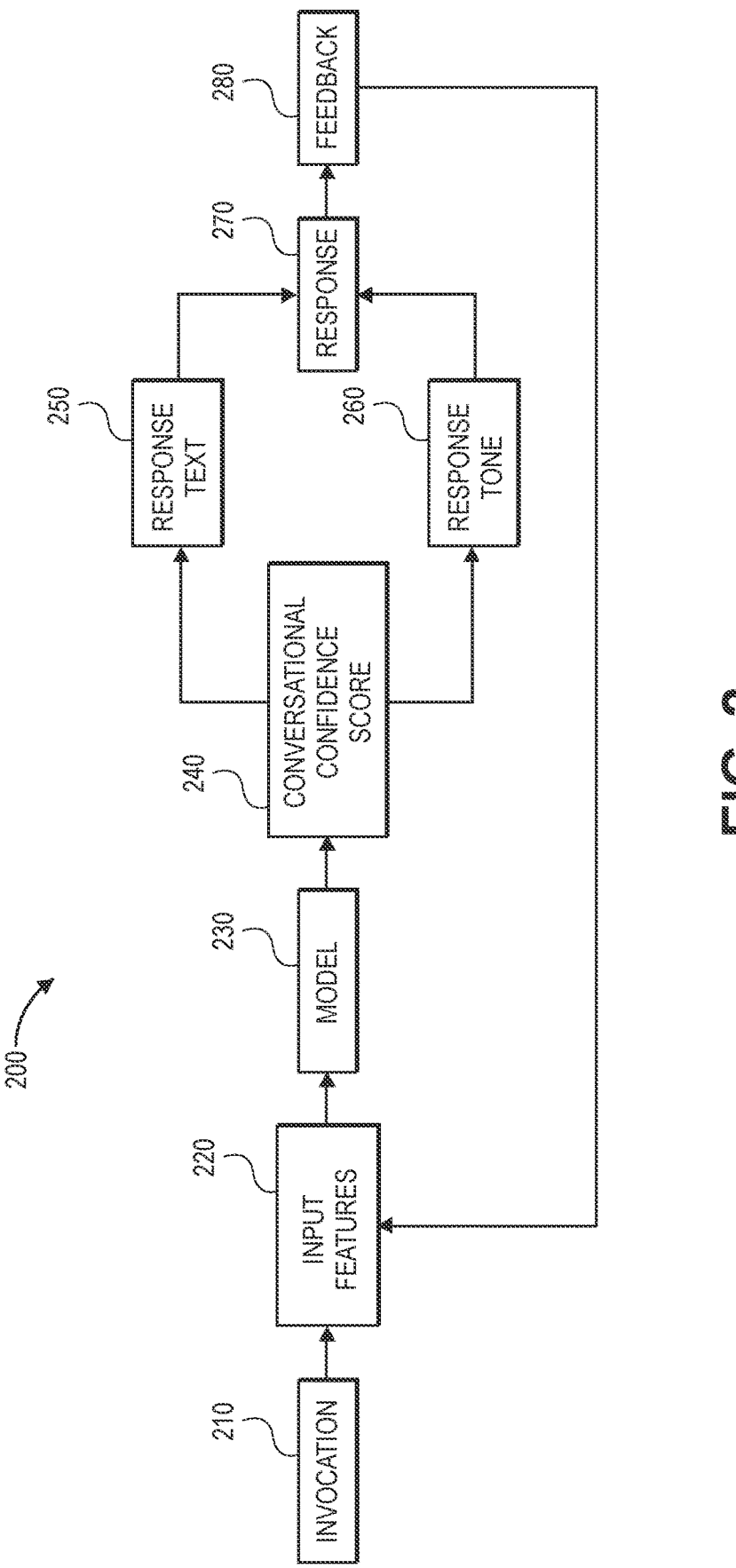
FIG. 2 is a flow diagram of one system for scoring conversational confidence in accordance with implementations of the present disclosure.

Referring to FIG. 2, a flow diagram of one system 200 for scoring conversational confidence in accordance with implementations of the present disclosure is shown. As is shown in FIG. 2, an invocation 210 may be received from a user, in the form of an utterance represented in audio data captured by a computer system (e.g., a smart speaker, a mobile device, an automobile, or others). The invocation 210 may be processed to identify one or more input features 220 regarding the user, the computer system, or the invocation 210. In some implementations, the input features 220 may include an interpretation of an utterance that included the invocation 210, e.g., text embodied in the audio data that may be automatically recognized and interpreted by the computer system that received the invocation 210, or another computer system in communication with the computer system that received the invocation 210. The input features 220 may also include interpretations of any other utterances received from the user.

In some implementations, the input features 220 may further identify any words or terms having a negative connotation or interpretation within an utterance that included the invocation 210, as well as a number of words or terms having negative connotations or interpretations in utterances previously received from the user. In some implementations, negative words or terms within the invocation 210, e.g., in feedback most recently received from the user, may be weighted more strongly than negative words or terms within other feedback previously received from the user.

In some implementations, the input features 220 may also identify a number of content samples previously presented to the user, or any neutral feedback previously received from the user, e.g., "next." The input features 220 may also include an indication as to how much feedback received from the user was relied upon in prior searches for content, and whether any personalized data, e.g., preferences of the user, or purchasing or listening histories of the user, was relied upon in one or more searches for content samples.

Once the input features 220 have been identified, the input features 220 are provided as inputs to a model 230 that is trained to output or otherwise calculate a confidence score (or goal success estimate) 240 for a conversation begun by the invocation 210. The model 230 may be programmed to apply weights to the various input features 220 that may be selected on any basis. The confidence score 240 may be indicative of a level of confidence that the conversation will achieve a goal of the user, or will otherwise have a successful outcome. Subsequently, a set of text 250 for inclusion in a response to be presented to the user, e.g., a dialog act, and a tone 260 of the response, are selected based on the confidence score 240. In some implementations, the confidence score 240 may be used to identify one or more auxiliary acts to be presented to the user, e.g., visible responses such as the display of images or lights, or any other acts.

Code for presenting a response 270 to the user, including the set of text 250 and in the tone 260, or any other parameters of any auxiliary acts, is transmitted to the computer system that received the invocation 210. In reply to the response 270, any feedback 280 received from the user, e.g., one or more utterances, may be processed to identify additional input features 220, or to revise any previously identified input features 220. A new set of input features 220 may be provided to the model 230, and a new confidence score 240 may be generated based on outputs received from the model 230.

Figure 3:
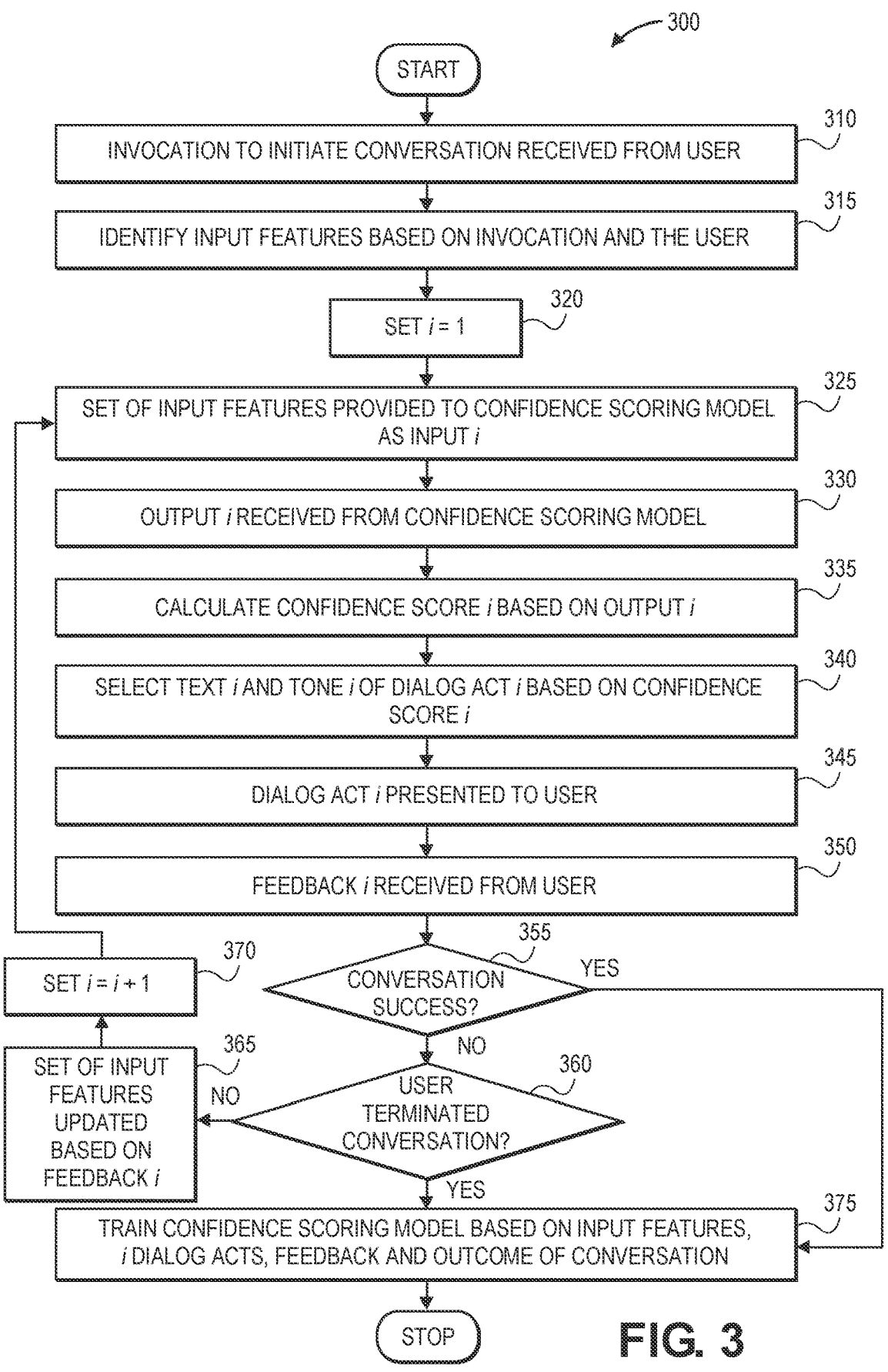
FIG. 3 is a flow chart of one process for scoring conversational confidence in accordance with implementations of the present disclosure.

As is discussed above, in a voice browsing experience, a confidence score (or a goal success estimate) may be calculated and updated at each turn in a conversation. The confidence score may represent a measure of how well a goal-oriented conversation is proceeding, at each turn, or a likelihood that the conversation will result in a success with respect to the goal. Referring to FIG. 3, a flow chart of one process 300 for scoring conversational confidence in accordance with implementations of the present disclosure is shown. At box 310, an invocation to initiate a conversation is received from a user. In some implementations, the invocation is included in one or more utterances represented in audio data captured by one or more microphones or other sensors provided on a computer system, such as a smart speaker, a mobile device, or an automobile. For example, the invocation may be a general or specific command spoken by the user, such as "help me find some music," or "recommend some music." In some implementations, the one or more utterances may include or be preceded by a "wake word," or a predetermined word or set of words (e.g., a phrase) that, when recognized within audio data captured by such sensors, activates a computer system and causes the computer system to execute one or more applications or functions based on other aspects of the audio data. For example, a balance of the audio data, other than a wake word, may be processed to identify one or more phonemes or words of the utterance and to determine that the utterance includes the invocation. Audio data including the invocation may be further processed to derive an intent or a desired action associated with the invocation, as well as any pertinent pieces of information that may allow the system or another service to act in response to the intent or to otherwise execute the action.

In some implementations, the invocation may be recognized as such by the computer system that captured the audio data in which the utterances including the invocation were represented. In some other implementations, the audio data or one or more representations thereof may be transmitted by one computer system that captured the audio data, e.g., a smart speaker, to another computer system, e.g., a computer server, over one or more networks. In some other implementations, a wake word may be recognized within audio data by the computer system that captured the audio data, before transmitting the audio data or one or more audio representations thereof to another computer system.

At box 315, one or more input features are identified based on the invocation and the user. The input features may include any data directly obtained from the user, e.g., during the conversation, as well as any other information or data that may be indirectly associated with the user, or regarding the user, which may be stored in a profile of the user, or associated with the computer system that captured the audio data.

For example, in some implementations, the input features may include an interpretation of the invocation or audio data in which the invocation was represented, e.g., by a natural language understanding (or "NLU") processing module, or interpretations of prior utterances received from the user, either in the current conversation or in one or more prior conversations. In some implementations, the input features may include an identifier of any negative comments received from the user, either in the current conversation or in any prior conversations. The input features may include any other information or data regarding the user, or a computer system from which audio data representing the invocation was received.

At box 320, a value of a step variable i is set equal to one, or i=1. At box 325, the set of input features is provided to a confidence scoring model as an input i. The confidence scoring model may be any type or form of algorithm, system or technique executed by the computer system that captured the audio data including the invocation, or another computer system, that is trained to receive the input features, which may include or represent any information or data directly or indirectly relating to the user, and to calculate a score or measure indicative of an understanding as to how well the conversation is progressing toward a goal, e.g., an identification of music or other media content of interest to the user, or an identification of an item of interest to the user. The set of features may also include an indication as to whether any information regarding preferences of the user, e.g., content or items previously requested or desired by the user, is available.

At box 330, an output i is received from the confidence scoring model in response to the input provided thereto at box 325. At box 335, a confidence score i is calculated based on the output i received from the confidence scoring model at box 330. The confidence score i may be qualitative or quantitative in nature, and may have any value or be within any range. In some implementations, the confidence scoring model may be programmed or configured to weight one or more of the input features differently than one or more other input features. For example, in some implementations, a most recent utterance or set of words received from the user may be weighted more strongly than less recent utterances or sets of words received from the user. Likewise, in some implementations, a negative utterance may be ranked more strongly than a neutral or a positive utterance.

Furthermore, in some implementations, the confidence score may be mapped to one or more discrete values or ranges, e.g., a high value or range, a medium value or range, or a low value or range, or any other value or range. Alternatively, in some implementations, upon receiving the invocation, a baseline confidence score, e.g., a value of 100, or another nominal value, may be selected as the initial confidence score for the invocation, independent of the confidence scoring model.

At box 340, a set of text i and a tone i are selected based on the confidence score i. In some implementations, the set of text i may include a preamble, or an introductory word or set of words, as well as a prefix and/or a suffix. To the extent that the confidence score i represents a trajectory of the conversation, a set of text or a tone that are consistent with that trajectory may be selected accordingly. For example, after a user has initiated a conversation, the set of text i and the tone i may be selected to sound excited and optimistic, or curious and interested, based on the confidence score i. Subsequently, where feedback in the form of further utterances is received from the user, and confidence scores are calculated based on such feedback, sets of text or tones may be selected accordingly based on such confidence scores, in order to more correlate with the trajectory of the conversation. In some implementations, parameters of an auxiliary act may also be selected based on the confidence score i. For example, data for presenting an image or another visual effect, e.g., the display of lights, by one or more output devices or features of a smart speaker or another computer system may be selected based on the confidence score i.

In some implementations, the set of text i or the tone i may be selected based on a value of the confidence score, or a range of values in which the confidence score i falls. Where a computer device intends to express a specific message or to communicate for a specific purpose, e.g., to request information, to propose media content, or to apologize or express regret, a plurality of dialog acts having various sets of text or tones may be identified or retrieved. For example, in some implementations, a predetermined number of different ways of expressing messages or communicating for purposes such as "what would you like to hear today," "how about this," or "I'm sorry," or like phrases, may be stored in one or more data stores. Where each of the plurality of dialog acts corresponds to a different level of confidence, a value of a confidence score, or a range in which the value of the confidence score falls (e.g., high confidence, medium confidence or low confidence) may be determined and used to select one of the different ways for expressing such messages or communicating for such purposes. For example, where a dialog act expressing an apology is determined to be necessary in order to advance a conversation toward a goal, and three sets of text or tones for expressing the apology are stored in one or more data stores, the set of text i or the tone i selected at box 340 may be a high-confidence set of text or tone for expressing the apology if the confidence score i has a high value, a medium-confidence set of text i or the tone i for expressing the apology if the confidence score i has a medium value or a low-confidence set of text i or the tone i for expressing the apology if the confidence score i has a low value. Similarly, multiple auxiliary acts associated with each of such dialog acts may be stored in one or more data stores, and one of such auxiliary acts may be selected to accompany a dialog act based on a value of the confidence score i, or a range in which the value of the confidence score i falls.

At box 345, a dialog act i is presented to the user. The dialog act i may include the set of text i selected at box 340, in any number of arguments, and in the tone i selected at box 340. For example, a set of audio data corresponding to the dialog act i may be transmitted to a smart speaker or another computer system that captured audio data including the invocation at box 310, and the computer system may output the audio data corresponding to the dialog act i to the user. In some implementations, the dialog act i may be accompanied by one or more samples of content, e.g., music or other media. In some implementations, a set of other data including parameters for presenting an auxiliary act, e.g., the presentation of one or more visual effects by a display, one or more lights or other features, may be transmitted to the smart speaker or the other computer system.

At box 350, feedback i is received from the user in response to the dialog act i. The feedback i may include one or more additional utterances, expressed in audio data captured by the smart speaker or other computer system that presented the dialog act i to the user.

At box 355, whether the conversation has succeeded is determined. For example, upon receiving the dialog act i including the set of text i and the tone i selected at box 340, audio feedback provided by the user may be processed to determine whether a goal identified from the invocation i has been met, according to one or more metrics (e.g., success metrics), or on any other basis. For example, where a user plays a selection of media (e.g., music) for at least a threshold period of time following the dialog act i, or elects to purchase an item after hearing the dialog act i, the conversation may be presumed to have been successful. Alternatively, where the user does not play the selected media for at least the threshold period of time, or does not elect to purchase an item, the conversation may be presumed to have been unsuccessful.

If the conversation has not been determined to be a success, then the process advances to box 360, where whether the user has terminated the conversation is determined. If the customer has not terminated the conversation, then the process advances to box 365, where the set of input features is updated based on the feedback i received from the user at box 350. For example, the set of input features may be updated to include an interpretation of the feedback i according to NLU, as well as one or more identifiers of any negative terms included in the feedback i. The set of input features may also include an indication as to whether the dialog act i included one or more samples of content, e.g., music or other media, or whether the feedback i marks a pivot or change in opinion of a preference of the user. The set of input features may further include an indication as to how many dialog acts have been presented to the user, viz., the value of the step variable i, or how many sets of feedback, have been received from the user.

At box 370, a value of the step variable i is incremented by one, or is set to equal i+1, before returning to box 325, where the set of input features is provided to the confidence scoring model as an input i.

If the conversation is determined to have been a success at box 355, or if the user is determined to have terminated the conversation at box 360, then the process advances to box 375, where the confidence scoring model is trained based on the input features, the i dialog acts presented to the user, the feedback received from the user in response to the i dialog acts, and an outcome of the conversation, and the process ends.

As is discussed above, conversational confidence scores may be calculated at each turn of a conversation, e.g., based on each utterance received from a user, and used to predict a dialog act, an auxiliary act or another response that may be provided to the user in an effort to advance the conversation toward a goal. The conversational confidence score may be a measure of confidence in how well a conversation is progressing toward a goal, such as the identification of media content or any other item that is preferred by a user, in a voice browsing experience. Referring to FIGS. 4A through 4F, views of aspects of one system for scoring conversational confidence in accordance with implementations of the present disclosure are shown.

Figure 4A:
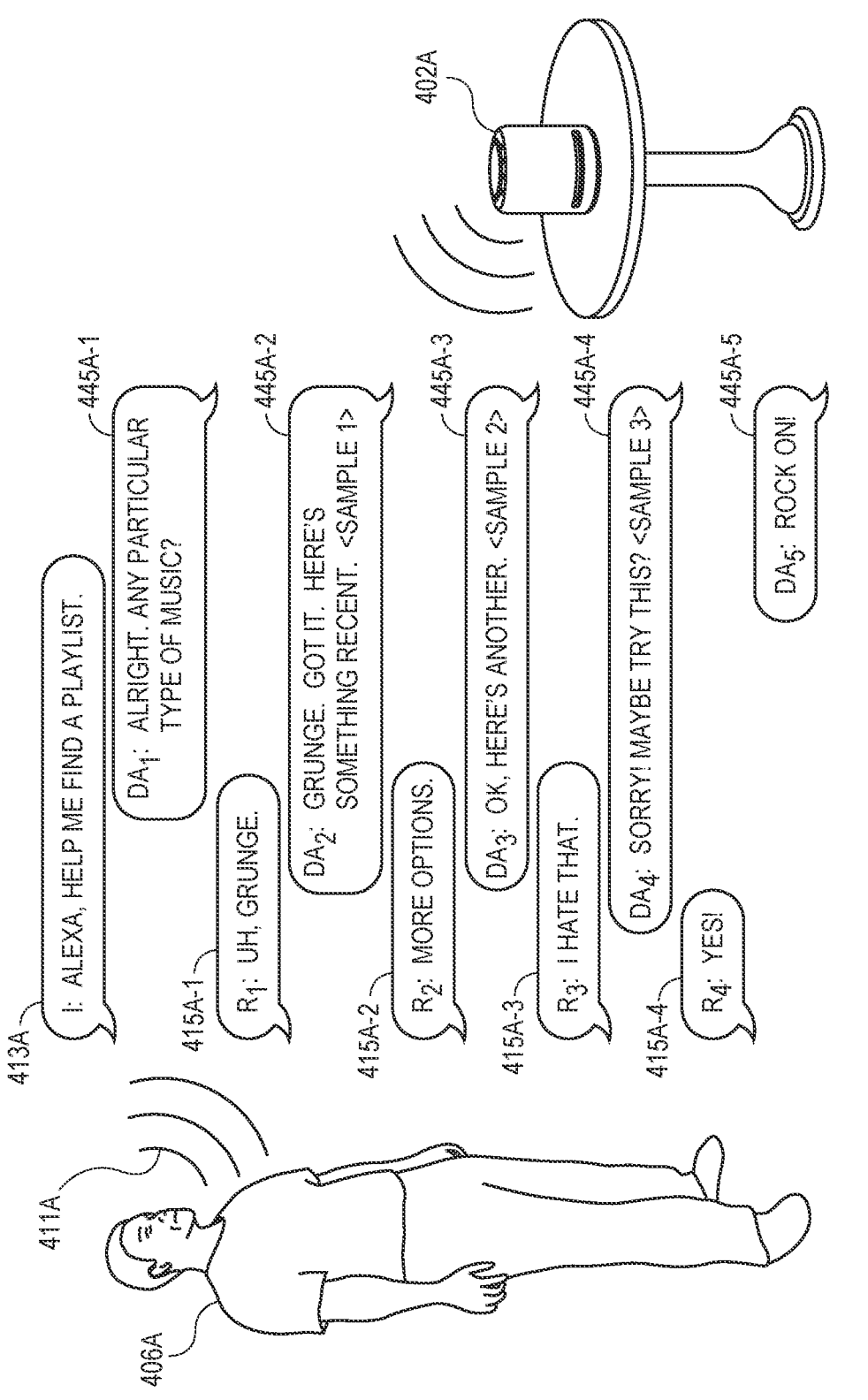

As is shown in FIG. 4A, a user 406A initiates a conversation with a smart speaker 402A or another computer system by providing audio signals including one or more utterances 411A of spoken words to the smart speaker 402A. In particular, the user 406A speaks an utterance including an invocation 413A of "Alexa, help me find a playlist." The smart speaker 402A may process the utterances 411A to recognize a wake word, viz., "Alexa," followed by a command, viz., "find," and a target of the command, viz., "a playlist," within the audio signals.

Upon capturing audio data corresponding to the utterances 411A and recognizing the command and target therein, the smart speaker 402A identifies one or more input features, and calculates a confidence score based on the input features. For example, the input features may include an abstraction of content of the utterances 411A, as determined by NLU processing, or any other utterances previously received from the user 406A. The input features may further indicate whether any of the utterances 411A includes words of a negative nature or context, such as "I hate that," "that song stinks," "no way," or others, or whether any other utterances previously received from the user 406A have included negative words. The input features may also indicate whether any samples of media have been previously provided to the user, or whether any neutral feedback or commands have been received from the user 406A, such as "next" or "another track." The input features may further indicate whether any information or data regarding the user 406A is available to personalize a search for content, e.g., a purchasing history, a listening history, or any other information or data regarding preferences of the user 406A, or how much information or data was previously used to identify content for the user 406A. Any other information or data regarding the user 406A or the smart speaker 402A may be included in one or more input features, or may be used to identify one or more input features.

In some implementations of the present disclosure, the input features identified based on the invocation 413A may be used to calculate a confidence score for the conversation between the user 406A and the smart speaker 402A.

The confidence score may be calculated in any manner, based on the input features. In some implementations, the input features may be provided to a linear model, or a linear regression model, as inputs, and the confidence score may be calculated based on outputs received in response to such inputs. In such implementations, the linear model may include one or more weights or other coefficients for each of a plurality of input features, or types of input features. In some implementations, the input features may be provided to a machine learning model trained to generate a confidence score as inputs, and the confidence score may be calculated based on outputs received in response to such inputs. In some other implementations, the confidence score may be calculated using any other type or form of model, and the individual input features may be weighted, as necessary. In some implementations, the confidence score calculated in response to the invocation 413A may be a baseline value that may be increased or decreased, as necessary, based on content of one or more subsequent responses received from the user 406A.

The confidence score may be then used to select a set of text to be included in a dialog act to be presented to the user 406A by the smart speaker 402A in reply to the invocation 413A, or a tone or duration of the dialog act, e.g., a number of words or arguments. The text or the tone of the dialog act may be selected to keep the user 406A interested in the conversation, and to indicate that the smart speaker 402A is positively engaged in achieving a goal, viz., the identification of music, on behalf of the user 406A. In some implementations, the confidence score may be mapped to a discrete value or range of values, e.g., a high confidence score, a medium confidence score, or a low confidence score, and a set of text and a tone of a dialog act may be selected to correspond to the value or range of values corresponding to the calculated confidence score.

As is further shown in FIG. 4A, using the confidence score, a dialog act 445A-1, or $DA_1$, viz., "Alright. Any particular type of music?" is presented to the user 406A by the smart speaker 402A. Upon hearing the dialog act 445A-1, the user 406A provides a response 415A-1, or $R_1$, to the smart speaker 402A, viz., "uh, grunge," and identifies a genre of music of interest to the user 406A. The content of the response 415A-1 received from the user 406A may be processed, e.g., by NLU processing, and used to update the input features based on an abstraction of content of the response 415A-1. For example, in some implementations, a search may be performed subject to constraints identified from any of the input features, including but not limited to contents of the invocation 413A or the response 415A-1.

As is also shown in FIG. 4A, a confidence score may be calculated based on updated or additional input features determined from feedback received from the user 406A in response to dialog acts. For example, a set of text and a tone of a dialog act 445A-2, or $DA_2$, viz., "Grunge. Got it. Here's something recent" and an audio sample in the genre identified by the user 406A, or "<sample 1>," may be selected based on the newly calculated confidence score. The dialog act 445A-2 is presented by the smart speaker 402A to the user 406A, and a response 415A-2, or $R_2$, viz., "more options," is received by the smart speaker 402A from the user 406A. The content of the response 415A-2 received from the user 406A may be processed, e.g., by NLU processing, and used to update the input features based on an abstraction of content of the response 415A-2. For example, the response 415A-2 of "more options" indicates that the genre requested by the user 406A remains accurate and relevant, and is not negative.

The content of the response 415A-2 received from the user 406A may be used to update the input features accordingly, and a confidence score may be calculated or a search for other content within the genre may be performed based on the updated input features. A set of text and a tone of a dialog act 445A-3, or $DA_3$, viz., "OK, here's another," and an additional audio sample, or "<sample 2>," may be selected based on the confidence score. The dialog act 445A-3 is presented by the smart speaker 402A to the user 406A, and a response 415A-3, or $R_3$, viz., "I hate that," is received by the smart speaker 402A from the user 406A. The content of the response 415A-3 received from the user 406A in reply to the dialog act 445A-3 may be identified as strongly negative, and the input features may be updated accordingly.

As is shown in FIG. 4A, a confidence score may be calculated or a search for other content within the genre may be performed based on the updated input features, and a set of text and a tone of a dialog act 445A-4, or $DA_4$, viz., "Sorry! Maybe try this?" and an additional audio sample, or "<sample 3>," may be selected based on the confidence score. The dialog act 445A-4 is presented by the smart speaker 402A to the user 406A, and a response 415A-4, or $R_4$, viz., "yes!," is received by the smart speaker 402A from the user 406A. The content of the response 415A-4 received from the user 406A in reply to the dialog act 445A-4 may be identified as positive, and the input features may be updated accordingly. A confidence score may be calculated based on the updated input features, and a set of text and a tone of a dialog act 445A-5, or $DA_5$, viz., "Rock on!" may be selected based on the confidence score. The dialog act 445A-5 may be presented to the user 406A by the smart speaker 402A, and the conversation may be deemed terminated without any further response from the user 406A.

Figure 4B:
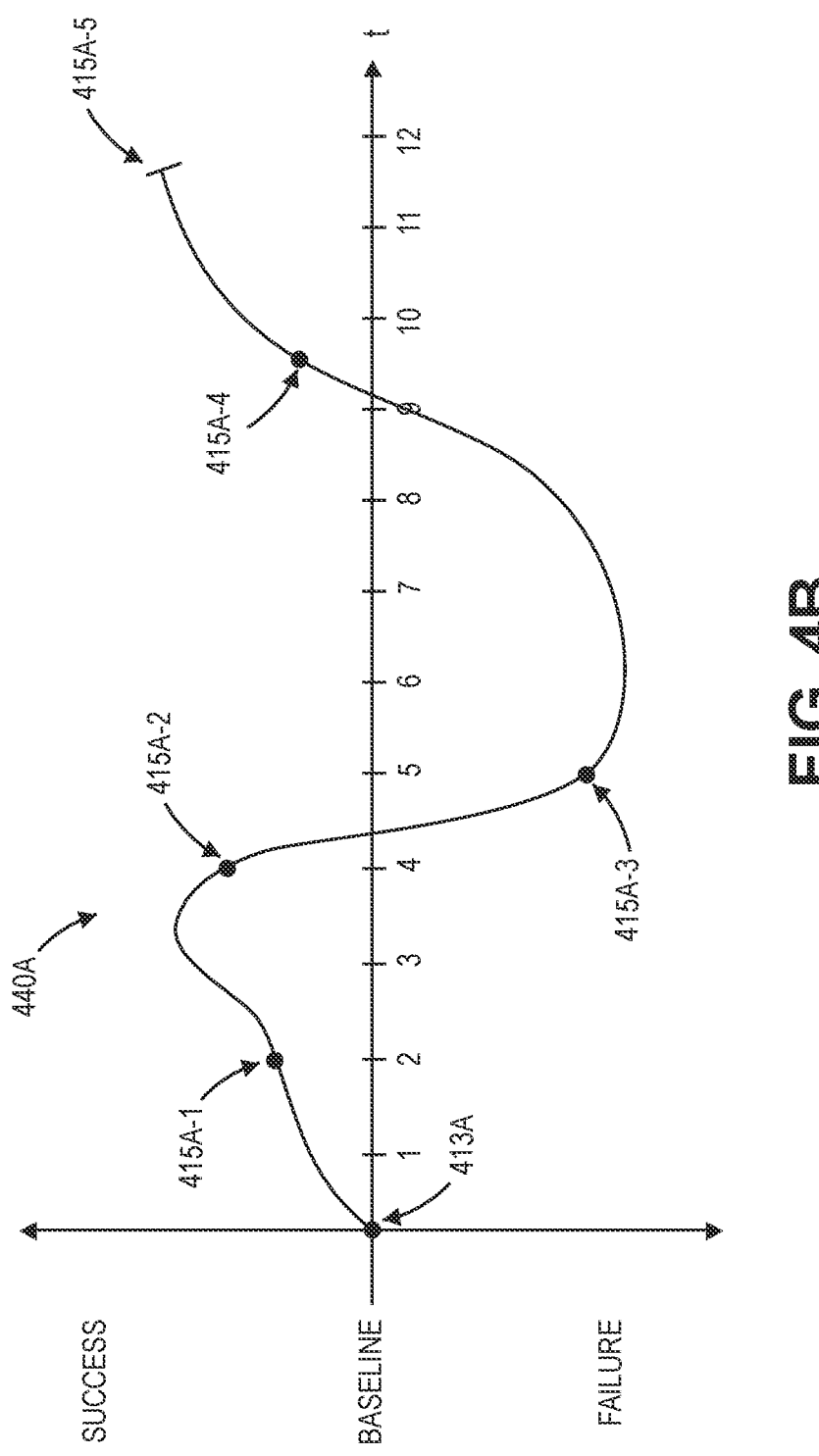

As is shown in FIG. 4B, a plot 440A of the confidence scores as a function of time, or CS(t), during the conversation between the user 406A and the smart speaker 402A of FIG. 4A is shown. For example, upon receiving the invocation 413A, the conversation begins, and the value of the confidence score at time $t_0$, or $CS(t_0)$, is a baseline value, e.g., a value of 100, or another nominal value. The values of the confidence score CS(t) during the conversation represent a conversational trajectory, or a turn-by-turn quality of the conversation, and indicate whether the conversation is likely to result in a successful outcome according to one or more metrics, e.g., a playing of selected media for at least a predetermined period of time, or a purchase of an item.

With values of the confidence score CS(t) increasing above the baseline value, the conversation may be said to be trending toward a successful outcome. After the dialog act 445A-1 is presented to the user 406A, and the response 415A-1 identifying the genre is received from the user 406A, the value of the confidence score CS(t) is recalculated and remains trending toward a successful outcome as the smart speaker 402A presents the dialog act 445A-2 and sample to the user 406A, given the identified genre and information or data that is known regarding the user 406A. In view of the response 415A-2 to the dialog act 445A-2 received from the user 406A, the value of the confidence score CS(t) begins to fall sharply below the baseline value, and the dialog act 445A-3 is presented to the user 406A.

Based on the negative response 415A-3 to the dialog act 445A-3, the set of text and the tone of the dialog act 445A-4, and the sample of content included therein, are specifically selected to avoid causing the user 406A to grow tired or disinterested in the conversation. For example, the set of text or the tone of the dialog act 445A-4 may be selected based on text or tones of dialog acts that are known to have led to successful outcomes in the past, either with the user 406A or in conversations having one or more similar input features. In view of the favorable response 415A-4 by the user 406A to the dialog act 445A-4, the value of the confidence score CS(t) increases above the baseline value, until the conversation ends with a response 415A-5 consistent with one or more metrics, and the conversation is terminated.

Figure 4C:
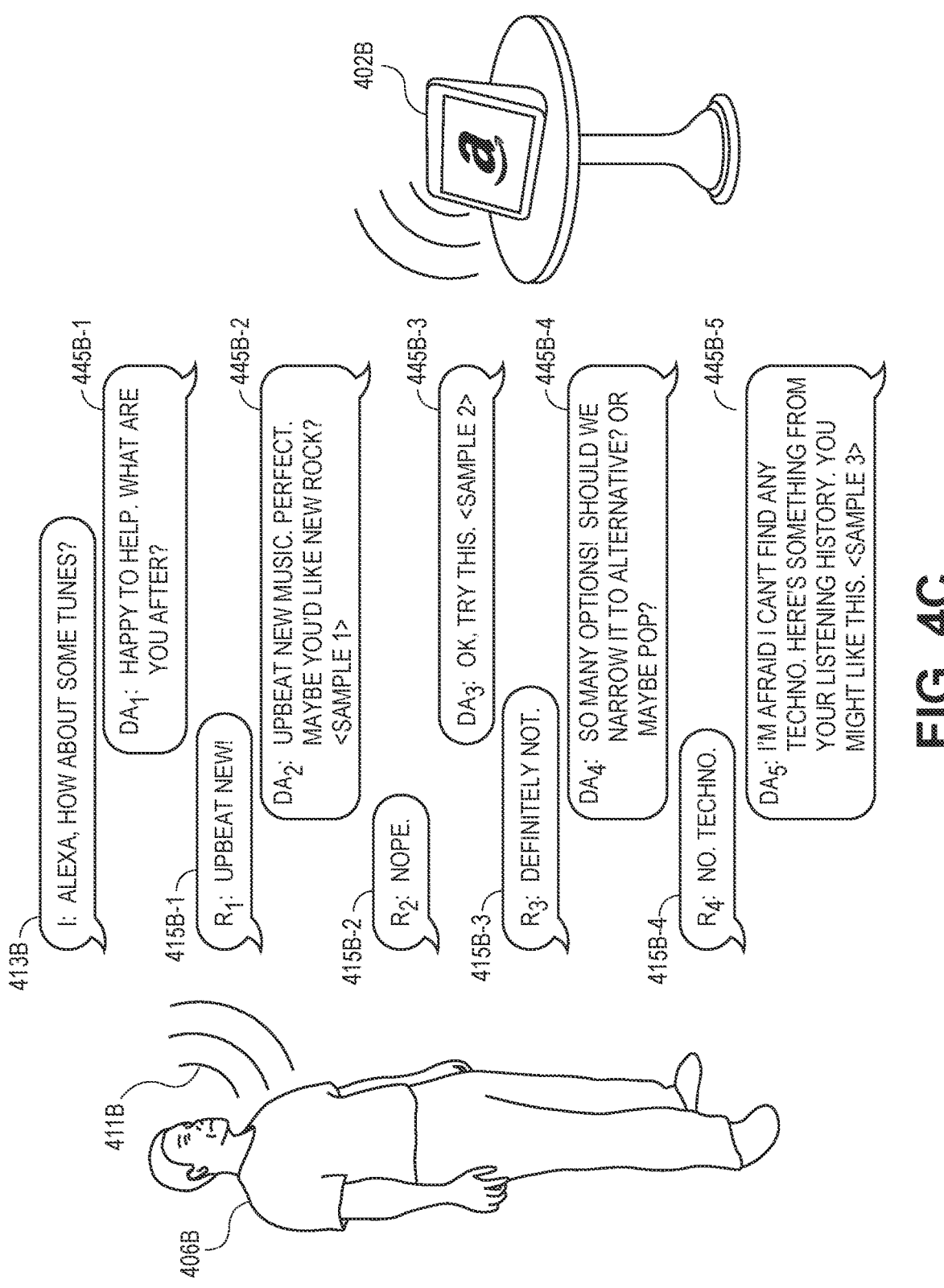

Similarly, as is shown in FIG. 4C, calculating confidence scores at each turn, or at every utterance or set of audio data received from a user, may increase a likelihood that a voice browsing experience ends in a successful outcome. As is shown in FIG. 4C, a user 406B initiates a conversation with a smart speaker 402B or another computer system by providing one or more utterances 411B including an invocation 413B of "Alexa, how about some tunes?" to the smart speaker 402B. Input features may be identified or calculated upon determining that the utterances 411B include a command, and a confidence score is calculated based on such input features.

An initial dialog act 445B-1, or $DA_1$, of "happy to help! What are you after?" is selected based on the confidence score and presented to the user 406B, who identifies a mood in a response 415B-1, or $R_1$, viz., "upbeat new!" to the dialog act 445B-1. Subsequently, sets of text and tones of a dialog act 445B-2 or $DA_2$ ("Upbeat new music. Perfect. Maybe you'd like New Rock?" and a sample), a dialog act 445B-3 or $DA_3$ ("OK, try this" and a sample), and a dialog act 445B-4 or $DA_4$ ("So many options! Should we narrow it to Alternative? Or maybe Pop?"), are selected and presented to the user 406B, based on confidence scores calculated following the response 415B-1 or $R_1$, a response 415B-2 or $R_2$ ("Nope") and a response 415B-3 or $R_3$ ("Definitely not."), which continue to drop in value. After a response 415B-4 or $R_4$ ("No. Techno.") to the dialog act 445B-4 indicates a preference for a genre that is different than either of the genres recommended in the dialog act 445B-4, and a substantially low confidence score is calculated, a set of text and a tone of a dialog act 415B-5 or $DA_5$, viz., "I'm afraid I can't find any techno. Here's something from your listening history. You might like this," and a sample are selected and presented to the user 406B. In view of the difficulty in identifying an acceptable sample for the user, the smart speaker 402B identifies a sample that is known to be preferred, or was known to have been preferred by the user 406B, and presents the dialog act 445B-5 to the user 406B.

Figure 4D:
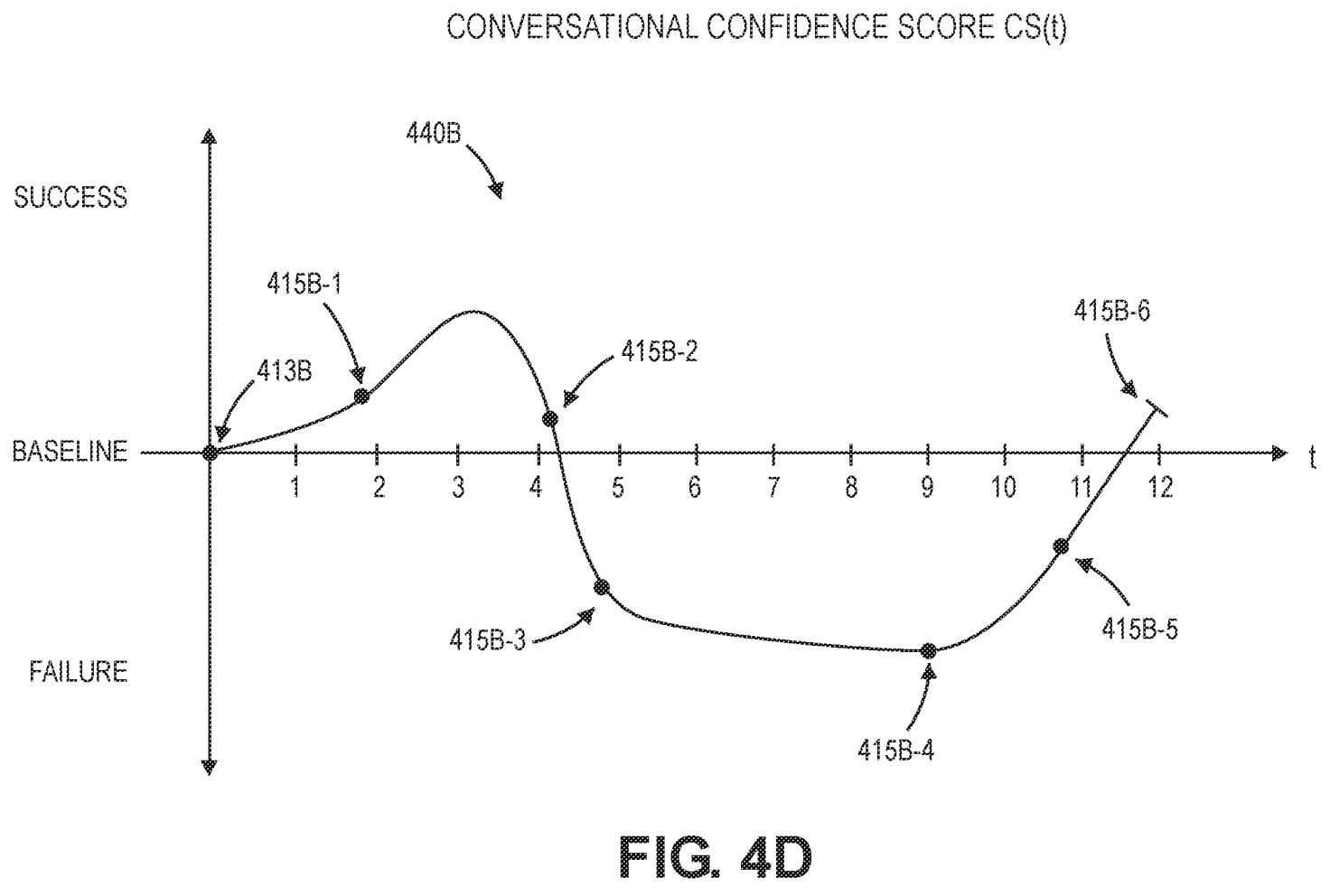

As is shown in FIG. 4D, a plot 440B of the confidence scores as a function of time, or CS(t), during the conversation between the user 406B and the smart speaker 402B of FIG. 4C is shown. Values of the confidence score CS(t) are calculated based on input features derived from feedback received from the user 406B, beginning with a baseline value upon receiving the invocation 413B and rising toward values corresponding to a successful outcome in response to the initial response 415B-1 of the user 406B before falling based on the responses 415B-2, 415B-3, 415B-4 received from the user 406B. The value of the confidence score CS(t) increases with the identification of a genre by the user 406B in the response 415B-5, thereby indicating that the user 406B remains interested in the conversation, until content from a listening history of the user 406B is presented in the dialog act 445B-5, and the conversation ends with a response 415B-6 consistent with one or more metrics, and the conversation is terminated.

Figure 4E:
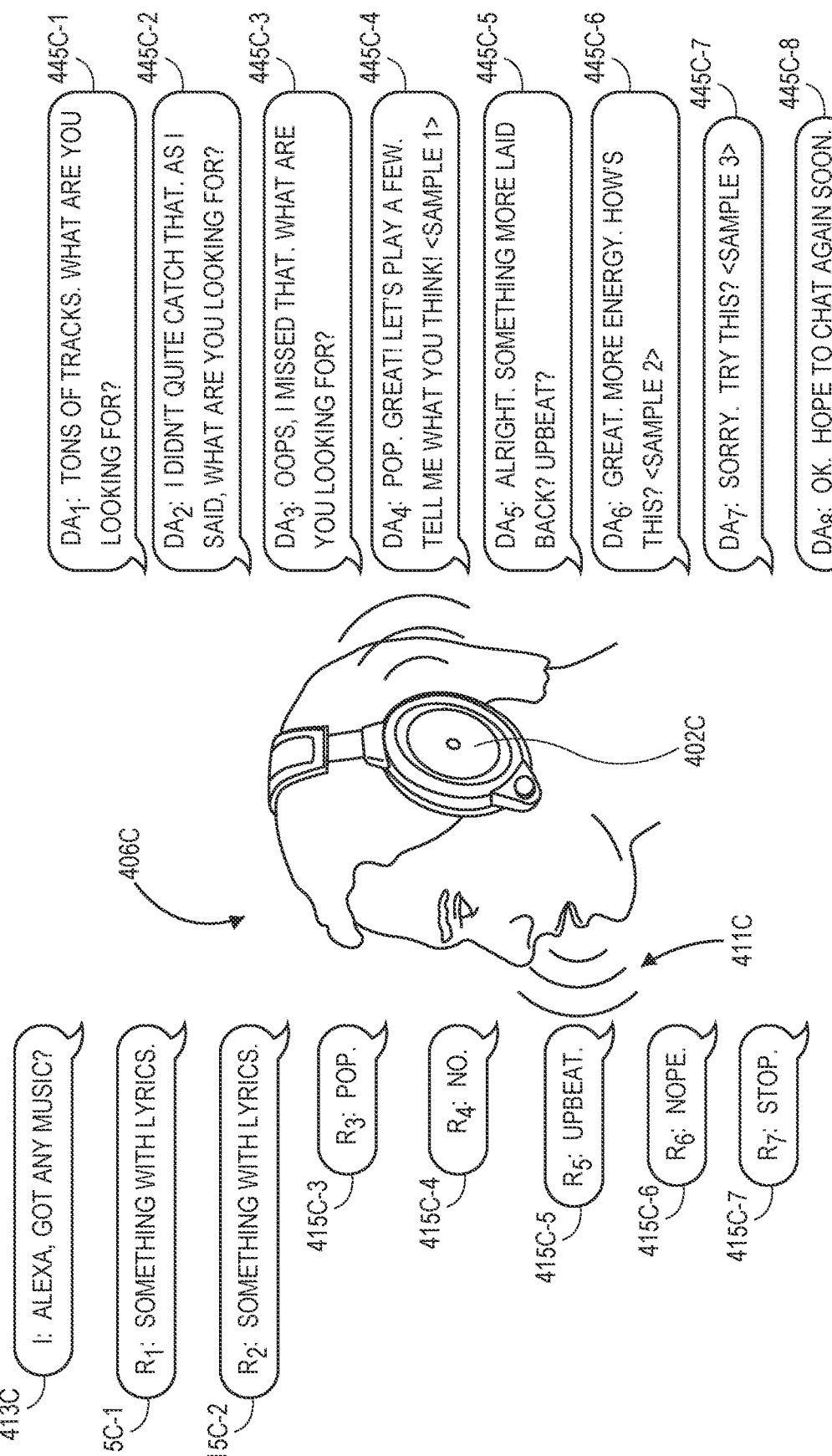

As is further shown in FIG. 4E, confidence scores calculated at each turn, or at every utterance or set of audio data received from a user, may indicate that a conversation is unlikely to end in a successful outcome. As is shown in FIG. 4E, a user 406C initiates a conversation with a set of headphones 402C or another computer system by providing one or more utterances 411C including an invocation 413C of "Alexa, got any music?" to the headphones 402C. The headphones 402C and the user 406C exchange dialog acts and responses, including a dialog act 445C-1 or $DA_1$ ("Tons of tracks. What are you looking for?"), a dialog act 445C-2 or $DA_2$ ("I didn't quite catch that. As I said, what are you looking for?"), and a dialog act 445B-3 or $DA_3$ ("Oops, I missed that. What are you looking for?"), having sets of text and tones selected based on confidence scores calculated following identical responses 415C-1, 415C-2 or $R_1$. $R_2$ ("Something with lyrics."), or and another response 415C-3 or $R_3$ ("Pop") that identifies a genre.

The headphones 402C and the user 406C continue to exchange dialog acts and responses after the genre is identified, including a dialog act 445C-4 or $DA_4$ ("Pop. Great! Let's play a few. Tell me what you think!" and a sample), a dialog act 445C-5 or $DA_5$ ("Alright. Something more laid back? Upbeat?"), a dialog act 445C-6 or $DA_6$ ("Great. More energy. How's this?" and a sample), or a dialog act 445C-7 or $DA_7$ ("Sorry. Try this?" and a sample) having sets of text and tones selected based on confidence scores calculated following a negative response 415C-4 or $R_4$ ("No"), a response 415C-5 or $R_5$ ("Upbeat") identifying a mood, and another negative response 415C-6 or $R_6$ ("Nope."). Another response 415C-7 or $R_7$ ("Stop") of the user 406C includes an express command to terminate the conversation, and prompts a dialog act 445C-8 or $DA_8$ ("OK. Hope to chat again soon.") having a set of text and a tone that was selected based on a confidence score calculated following the response 415C-7, in order to politely acknowledge the command.

Figure 4F:
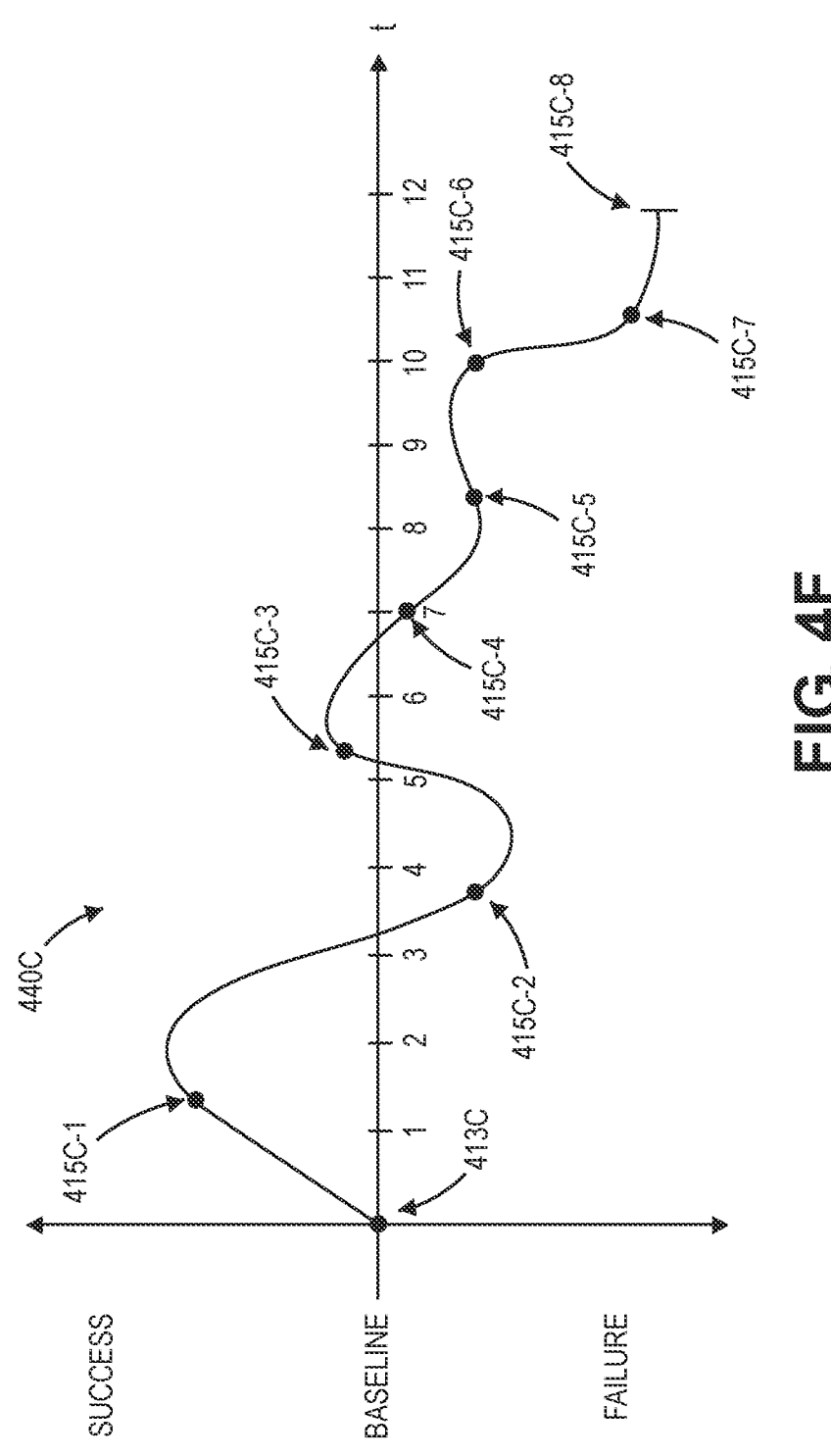

As is shown in FIG. 4F, a plot 440C of the confidence scores as a function of time, or CS(t), during the conversation between the user 406C and the headphones 402C of FIG. 4E is shown. Values of the confidence score CS(t) are calculated based on input features derived from feedback received from the user 406C, beginning with a baseline value upon receiving the invocation 413C and rising following the initial response 415C-1 of the user 406C before generally descending following each of the responses 415C-

2, 415C-3, 415C-4, 415C-5, 415C-6 until a response 415C-7 terminates the conversation in a successful manner.

Although each of the plots 440A, 440B, 440C shown in FIGS. 4B, 4D and 4F indicate that values of the confidence scores may increase or decrease over time, in some implementations, models for calculating the values of the confidence scores may be trained or configured to account for a duration of a conversation, and to degrade values of confidence scores calculated thereby on account of conversational friction that may result from errors in processing utterances, recognizing words, or delays in arriving at an appropriate selection or outcome for the user.

Figure 5A:
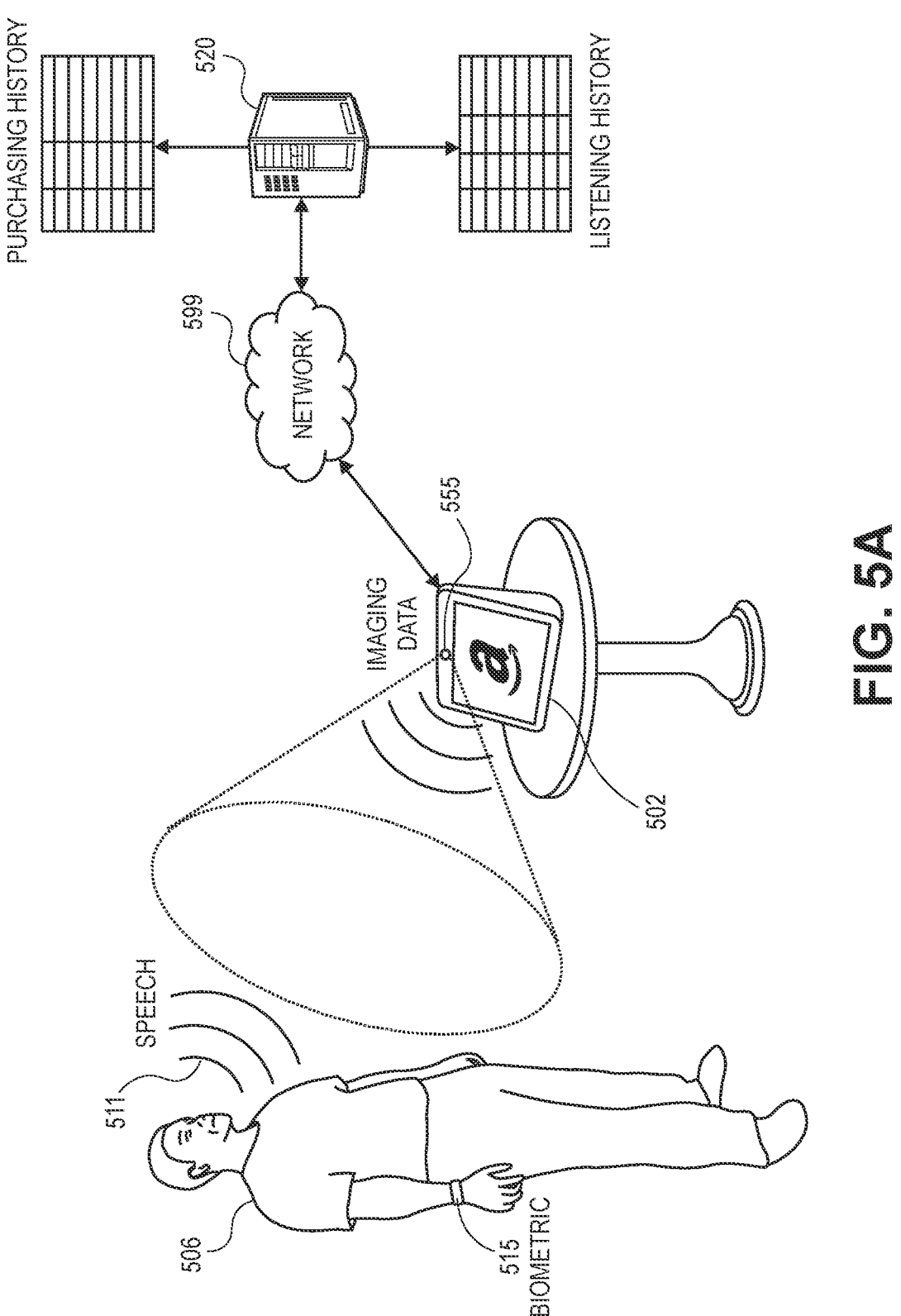
FIGS. 5A and 5B are views of aspects of one system for scoring conversational confidence in accordance with implementations of the present disclosure.
Figure 5B:
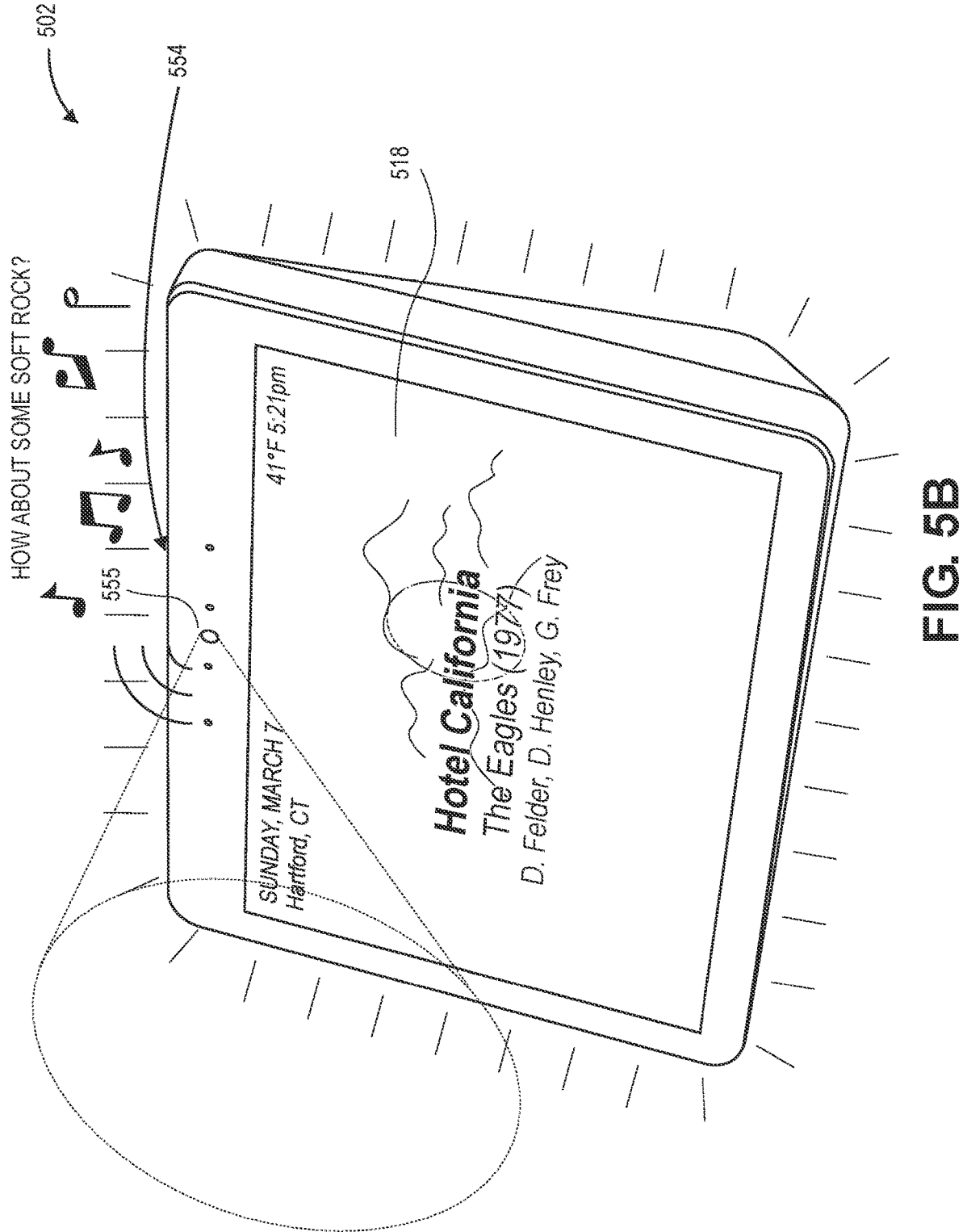

Data from which input features may be identified may be captured or otherwise obtained from any source, and dialog acts or other acts (e.g., auxiliary acts) may be presented to users in any manner. Referring to FIGS. 5A and 5B, views of aspects of one system for scoring conversational confidence in accordance with implementations of the present disclosure is shown.

As is shown in FIG. 5A, a user 506 engages in a conversation with a computer device (e.g., a smart speaker) 502 or another computer system that is connected to one or more external computer systems 520 over a network 599. The computer device 502 includes one or more audio capture components, e.g., a microphone, as well as a camera 555 or another imaging device, and any number of components such as processors, memory components or storage devices. The computer device 502 may execute one or more wake word detection modules, ASR modules or NLU modules or other programs or applications for processing audio signals 511 (e.g., speech) provided by the user 506, e.g., to detect, recognize or interpret words represented within the audio signals 511, or to execute one or more commands embodied in such words. Additionally, the external computer systems 520 may be programmed or configured to execute any of the same modules, programs or applications as the computer device 502, or one or more other modules, programs or applications.

Input features may be identified or obtained based on any data directly or indirectly related to the user 506. For example, one or more input features may be derived from sounds included in the audio signals 511, including one or more spoken words, as well as frequencies or wavelengths, speech rates or other aspects of the audio signals 511, which may be processed to identify one or more characteristics of the user 506, such as an emotional state of the user 506. One or more input features may also be derived from images of the user 506 captured by the camera 555, which may also be processed to identify one or more characteristics of the user 506. Additionally, where the user 506 is wearing, carrying or adjacent to one or more wearable sensors 515 (e.g., a band including one or more of such sensors that is worn about a wrist or other body part of the user 506), information or data captured by the wearable sensors 515, such as body temperature, motion, heart rates, tone of voice, fitness metrics or others may also be used to derive one or more input features. Moreover, where the user 506 may be identified based on the audio signals 511, images captured by the camera 555, or information or data captured by the wearable sensors 515, other attributes regarding the user 506 may be identified and used to derive one or more input features. For example, as is shown in FIG. 5A, upon identifying the user 506, one or more attributes of the user 506, including but not limited to a history of items that are known or believed to have been purchased (or used or owned) by the user 506, or a history of content that is known or believed to have been listened to or preferred by the user 506, may be identified in one or more records stored by the computer device 502 or the external computer systems 520.

Any information or data captured or stored by the computer device 502 or the external computer systems 520 may be processed, by the computer device 502 or the external computer systems 520, to derive one or more input features of the user 506 or a conversation with the user, or to update one or more input features that have been derived, and to calculate a conversational confidence score based on such input features.

Confidence scores calculated for a conversation may be used to select text or tone of a dialog act, or an auxiliary act to accompany the dialog act, which may be presented by the computer device 502 in any number of ways. For example, as is shown in FIG. 5B, the computer device 502 may present dialog acts (viz., "How about some soft rock?" or samples of audio content (viz., a portion of the 1977 song "Hotel California," by The Eagles) to the user 506 via a speaker 554. Additionally, where the computer device 502 is outfitted with one or more other output devices, such as a display 518, the computer device 502 may present auxiliary acts to the user 506 via the display 518. Such auxiliary acts may involve the display of images or other visual content, including text of a dialog act or other media content being presented to the user 506 via the speaker 554, a title of media content being played by the speaker 554, or any other information or data regarding the media content (e.g., a year in which the media content was first produced, an artist or group responsible for playing the media content, or authors or creators of the media content), along with any other information or data, e.g., a time or a date, a location of the computer device 502, a temperature in the location of the computer device 502, or others. The images or the visual content may be selected based on the confidence scores calculated for the conversation, in order to advance the conversation toward a stated goal.

Moreover, in some implementations, output features of a computer device may be utilized to enhance a level of accuracy or relevance of information or data received from a user. For example, in some implementations, where a response provided by a computer device from a user is not clear, the computer device or system may reply with a dialog act having a form of a question such as "I'm sorry, could you please repeat that?" or "Say again?" In some other implementations, however, where the computer device or system includes a display, the computer device or system may display one or more sets of text indicative of the most accurate predictions as to the spoken text included in the response received from the user, along with a dialog act such as "Please see the display. Did you mean one of these?" In still other implementations, the computer device or system may cause such sets of text to be displayed on a mobile device of the user, and may present a dialog act such as "Please look at your phone. Did you mean one of those?" Conversations between a computer device or system and a user may utilize any number of additional computer devices or systems and their respective features in accordance with embodiments of the present disclosure.

Figure 6:
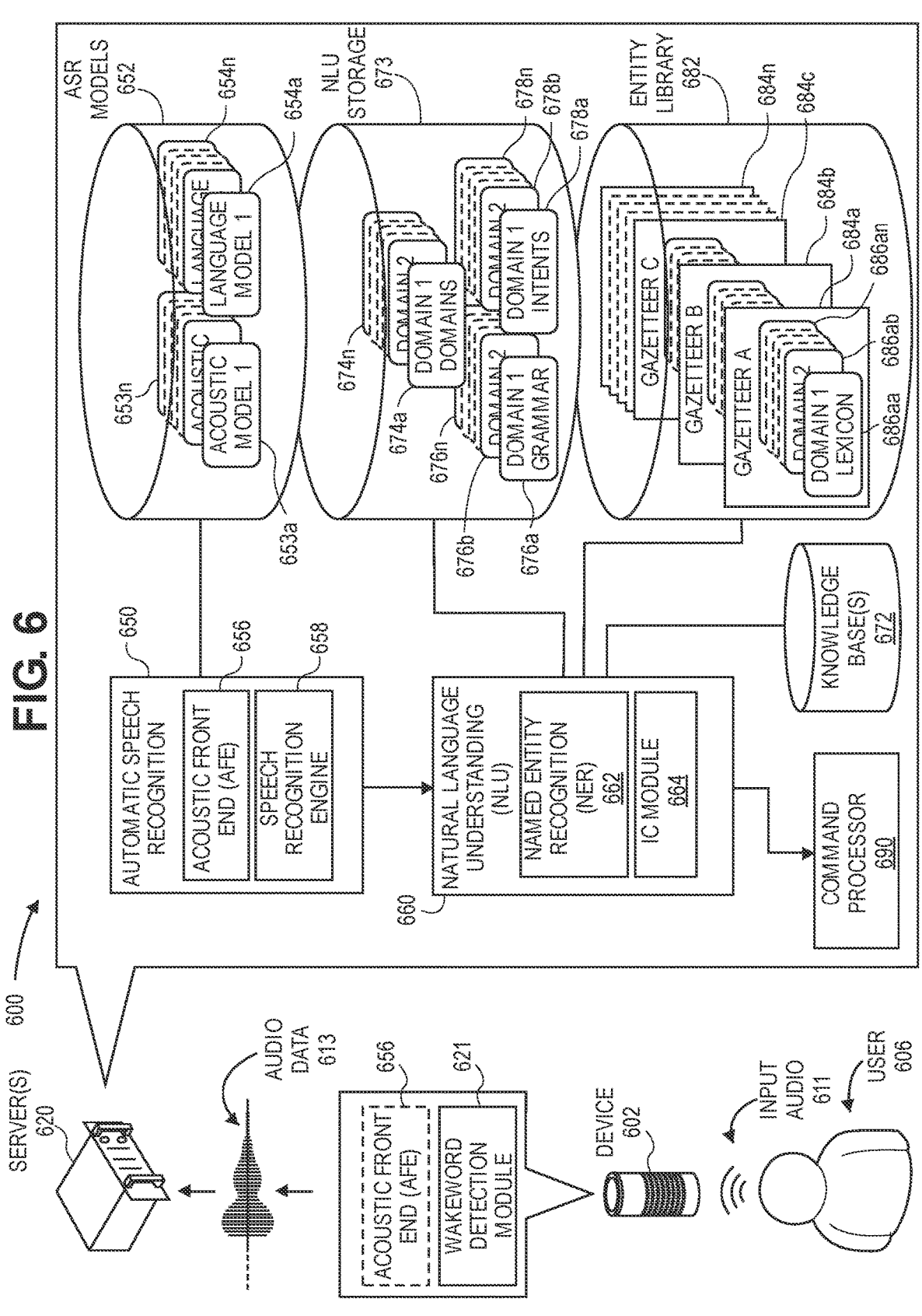
FIG. 6 is a view of aspects of one system for scoring conversational confidence in accordance with implementations of the present disclosure.

FIG. 6 is a conceptual diagram of how an utterance spoken by a user is processed, in order to allow a system to capture and execute commands, e.g., spoken commands that may follow a wake word. The various components shown in FIG. 6 may be located on the same physical device, or on different physical devices. Communication between various components illustrated in FIG. 6 may occur directly or across a network. An audio capture component, such as a microphone of device 602, captures audio 611 corresponding to a spoken utterance from a user 606. The device 602, using a wake word detection module 621, may then process the audio, or audio data corresponding to the audio, to determine if a keyword (such as a wake word) is detected in the audio. Following detection of a wake word, the device sends audio data 613 corresponding to the utterance to a server 620 that includes an ASR module 650. The audio data 613 may be output from an acoustic front end (AFE) 656 located on the device 602 prior to transmission. Or the audio data 613 may be in a different form for processing by a remote AFE 656, such as the AFE 656 located with the ASR module 650.

The wake word detection module 621 works in conjunction with other components of the device, for example, a microphone to detect keywords in the input audio 611. For example, the device 602 may convert input audio 611 into audio data 613, and process the audio data with the wake word detection module 621 to determine whether speech is detected, and, if so, if the audio data comprising speech matches an audio signature and/or model corresponding to a particular keyword.

The device 602 may use various techniques to determine whether audio data includes speech. Some implementations may apply voice activity detection (or "VAD") techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other implementations, the device 602 may implement a limited classifier configured to distinguish speech from background noise. The classifier may be implemented by techniques such as linear classifiers, support vector machines, and decision trees. In still other implementations, Hidden Markov Model (or "HMM") or Gaussian Mixture Model (or "GMM") techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the input audio 611 received by the device 602 (or separately from speech detection), the device 602 may use the wake word detection module 621 to perform wake word detection to determine when a user intends to speak a command to the device 602. This process may also be referred to as keyword detection, with the wake word being a specific example of a keyword. Specifically, keyword detection is typically performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wake word detection module 621 may compare audio data to stored models or data to detect a wake word. One approach for wake word detection applies general large vocabulary continuous speech recognition (or "LVCSR") systems to decode the audio signals, with wake word searching conducted in the resulting lattices or confusion networks. LVCSR decoding may require relatively high computational resources. Another approach for wake word spotting builds HMMs for each key wake word and non-wake word speech signals, respectively. The non-wake word speech includes other spoken words, background noise, etc. There can be one or more HMMs built to model the non-wake word speech characteristics, which are named filler models. Viterbi decoding is used to search the best path in the decoding graph, and the decoding output is further processed to make the decision on keyword presence. This approach can be extended to include discriminative information by incorporating hybrid deep neural network (or "DNN")-HMM decoding framework. In another implementation, the wake word spotting system may be built on DNN or recursive neural network (or "RNN") structures directly, without HMM involved. Such a system may estimate the posteriors of wake words with context information, either by stacking frames within a context window for DNN, or using RNN. Following-on, posterior threshold tuning or smoothing is applied for decision making. Other techniques for wake word detection, such as those known in the art, may also be used.

Once the wake word is detected, the local device 602 may "wake" and begin transmitting audio data 613 corresponding to input audio 611 to the server(s) 620 for speech processing. Audio data 613 corresponding to the input audio 611 may be sent to a server 620 for routing to a recipient device or may be sent to the server for speech processing for interpretation of the included speech (e.g., for purposes of executing a command in the speech, or for other purposes). The audio data 613 may include data corresponding to the wake word, or the portion of the audio data corresponding to the wake word may be removed by the local device 602 prior to sending. Further, a local device 602 may "wake" upon detection of speech or spoken audio above a threshold. Upon receipt by the server(s) 620, an automatic speech recognition (or "ASR") module 650 may convert the audio data 613 into text. The ASR module 650 transcribes audio data into text data representing the words of the speech contained in the audio data. The text data may then be used by other components for various purposes, such as executing system commands, inputting data, etc. A spoken utterance in the audio data is input to a processor configured to perform ASR, which then interprets the utterance based on the similarity between the utterance and pre-established language models 654a-654n stored in an ASR model knowledge base (ASR Models Storage 652). For example, an ASR process may compare the input audio data with models for sounds (e.g., sub-word units or phonemes) and sequences of sounds to identify words that match the sequence of sounds spoken in the utterance of the audio data.

The different ways in which a spoken utterance may be interpreted (e.g., different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 653a-653n stored in an ASR Models Storage 652), and the likelihood that a particular word which matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR module 650 outputs the most likely text recognized in the audio data. The ASR module 650 may also output multiple hypotheses in the form of a lattice or an N-best list with each hypothesis corresponding to a confidence score or other score (such as probability scores, etc.).

The device or devices performing ASR processing may include an acoustic front end (or "AFE") 656 and a speech recognition engine 658. The acoustic front end (AFE) 656 transforms the audio data from the microphone into data for processing by the speech recognition engine. The speech recognition engine 658 compares the speech recognition data with acoustic models 653, language models 654, and other data models and information for recognizing the speech conveyed in the audio data. The AFE 656 may reduce noise in the audio data and divide the digitized audio data into frames representing time intervals for which the AFE 656 determines a number of values, called features, representing the qualities of the audio data, along with a set of those values, called a feature vector, representing the features or qualities of the audio data within the frame. Many different features may be determined, as known in the art, and each feature represents some quality of the audio that may be useful for ASR processing. A number of approaches may be used by the AFE 656 to process the audio data, such as mel-frequency cepstral coefficients (or "MFCC"), perceptual linear predictive (or "PLP") techniques, neural network feature vector techniques, linear discriminant analysis, semi-tied covariance matrices, or other approaches known to those of skill in the art.

The speech recognition engine 658 may process the output from the AFE 656 with reference to information stored in speech or model storage (652). Alternatively, post front-end processed data (such as feature vectors) may be received by the device executing ASR processing from another source besides the internal AFE. For example, the device 602 may process audio data into feature vectors (for example using an on-device AFE 656) and transmit that information to a server across a network for ASR processing. Feature vectors may arrive at the server encoded, in which case they may be decoded prior to processing by the processor executing the speech recognition engine 658.

The speech recognition engine 658 attempts to match received feature vectors to language phonemes and words as known in the stored acoustic models 653 and language models 654. The speech recognition engine 658 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that an ASR process will output speech results that make sense grammatically. The specific models used may be general models or may be models corresponding to a particular domain, such as music, banking, etc.

The speech recognition engine 658 may use a number of techniques to match feature vectors to phonemes, for example using HMMs to determine probabilities that feature vectors may match phonemes. Sounds received may be represented as paths between states of an HMM and multiple paths may represent multiple possible text matches for the same sound.

Following ASR processing, the ASR results may be sent by the speech recognition engine 658 to other processing components, which may be local to the device performing ASR and/or distributed across the network(s). For example, ASR results in the form of a single textual representation of the speech, an N-best list including multiple hypotheses and respective scores, lattice, etc., may be sent to a server, such as server 620, for NLU processing, such as conversion of the text into commands for execution, either by the device 602, by the server 620, or by another device (such as a server running a specific application like a search engine, etc.).

A device performing NLU processing 660 (e.g., server 620) may include various components, including potentially dedicated processor(s), memory, storage, etc. As shown in FIG. 6, an NLU component may include a named entity recognition (or "NER") module 662 which is used to identify portions of query text that correspond to a named entity that may be recognizable by the system. A downstream process called named entity resolution actually links a text portion to an actual specific entity known to the system. To perform named entity resolution, the system may utilize gazetteer information (684a, 684b, 684c . . . 684n) stored in entity library storage 682. The gazetteer information may be used for entity resolution, for example matching ASR results with different entities (such as song titles, user names, etc.). Gazetteers may be linked to users (for example, a particular gazetteer may be associated with a specific user's list or collection of other user contacts), may be linked to certain domains (such as communication), or may be organized in a variety of other ways.

Generally, a NLU process takes textual input (such as processed from ASR 650 based on the utterance input audio 611) and attempts to make a semantic interpretation of the text. That is, a NLU process determines the meaning behind the text based on the individual words and then implements that meaning. NLU processing 660 interprets a text string to derive an intent or a desired action from the user as well as the pertinent pieces of information in the text that allow a device (e.g., device 602) or other service, such as a music service, to complete that action. For example, if a spoken utterance is processed using ASR 650 and outputs the text "Let me hear a song from Foo Fighters," the NLU process may determine that the user intended to initiate a music session using the device 602 and to hear music matching the entity "Foo Fighters" (which may involve a downstream command processor 690 linked with a communication session application).

A NLU may process several textual inputs related to the same utterance. For example, if the ASR 650 outputs N text segments (as part of an N-best list), the NLU may process all N outputs to obtain NLU results.

A NLU process may be configured to parse and tag or otherwise annotate text as part of NLU processing. For example, for the text "Play some Macklemore," "play" may be tagged as a command (to begin the presentation of music or other media) and "Macklemore" may be tagged as a specific entity and target of the command (and an identifier of an entity corresponding to "Macklemore" may be included in the annotated result). For the text "Call Mom," "call" may be tagged as a command (e.g., to execute a phone call), and "Mom" may be tagged as a specific entity and target of the command (and an identifier of an entity corresponding to "Mom" may be included in the annotated result). Further, the NLU process may be used to provide answer data in response to queries, for example, using knowledge base 672.

To correctly perform NLU processing of speech input, an NLU process 660 may be configured to determine a "domain" of the utterance so as to determine and narrow down which services offered by the endpoint device (e.g., server 620 or device 602) may be relevant. For example, an endpoint device may offer services relating to interactions with a communication service, a contact list service, a calendar/scheduling service, a music player service, etc. Words in a single text query may implicate more than one service, and some services may be functionally linked (e.g., both a communication service and a calendar service may utilize data from the contact list).

The name entity recognition (or "NER") module 662 receives a query in the form of ASR results and attempts to identify relevant grammars and lexical information that may be used to construe meaning. To do so, the NER module 662 may begin by identifying potential domains that may relate to the received query. The NLU storage 673 includes a database of devices (674a-674n) identifying domains associated with specific devices. For example, the device 602 may be associated with domains for music, communication sessions, calendaring, contact lists, and device-specific communications, but not video. In addition, the entity library may include database entries about specific services on a specific device, either indexed by Device ID, User ID, or Household ID, or some other indicator.

In NLU processing, a domain may represent a discrete set of activities having a common theme, such as "music," "communication session," "shopping," "calendaring," etc. As such, each domain may be associated with a particular language model and/or grammar database (676a, 676b . . . 676n), a particular set of intents/actions (678a, 678b-678n), and a particular personalized lexicon (686). Each gazetteer (684a-684n) may include domain-indexed lexical information associated with a particular user and/or device. For example, the Gazetteer A (684a) includes domain-index lexical information 686aa, 686ab-686an. A user's music-domain lexical information might include album titles, artist names, and song names, for example, whereas a user's contact-list lexical information might include the names of contacts, identifiers for devices associated with those contacts, device characteristics, etc. Since every user's music collection and contact list is presumably different, this personalized information improves entity resolution.

As noted above, in traditional NLU processing, a query may be processed applying the rules, models, and information applicable to each identified domain. For example, if a query potentially implicates both communications and music, the query may, substantially in parallel, be NLU processed using the grammar models and lexical information for communications, and will be processed using the grammar models and lexical information for music. The responses based on the query produced by each set of models is scored, with the overall highest ranked result from all applied domains ordinarily selected to be the correct result.

An intent classification (or "IC") module 664 parses the query to determine an intent or intents for each identified domain, wherein the intent corresponds to the action to be performed that is responsive to the query. Each domain is associated with a particular set of intents/actions (678a-678n) of words linked to intents. For example, a music intent may link words and phrases such as "quiet," "volume off," and "mute" to a "mute" intent. The IC module 664 identifies potential intents for each identified domain by comparing words in the query to the words and phrases in the set of intents actions 678 for that domain. Traditionally, the determination of an intent by the IC module is performed using a set of rules or templates that are processed against the incoming text to identify a matching intent.

In order to generate a particular interpreted response, the NER 662 applies the grammar models and lexical information associated with the respective domain to actually recognize and mention one or more entities in the text of the query. In this manner, the NER 662 identifies "slots" (i.e., particular words in query text) that may be needed for later command processing. Depending on the complexity of the NER 662, it may also label each slot with a type of varying levels of specificity (such as noun, place, city, artist name, song name, or the like). Each grammar model 676 includes the names of entities (i.e., nouns) commonly found in speech about the particular domain (i.e., generic terms), whereas the lexical information 686 from the gazetteer 684 is personalized to the user(s) and/or the device. For instance, a grammar model associated with a music domain, a communication session domain or a shopping domain may include a database of words commonly used when people discuss music, communication sessions or shopping, respectively, and/or constraints to include with music, communication sessions or shopping, respectively.

The intents identified by the IC module 664 are linked to domain-specific grammar frameworks (included in 676) with "slots" or "fields" to be filled. Each slot or field corresponds to a portion of the query text that the system believes corresponds to an entity. For example, if "Play music" is an identified intent, a grammar framework or frameworks 676 may correspond to sentence structures such as "Play {Artist Name}," "Play {Album Name}," "Play {Song Name}," "Play {Song Name} by {Artist Name}," etc. However, to make resolution more flexible, these frameworks would ordinarily not be structured as sentences, but rather based on associating slots with grammatical tags.

For example, the NER module 662 may parse the query to identify words as subject, object, verb, preposition, etc., based on grammar rules and/or models, prior to recognizing named entities. The identified verb may be used by the IC module 664 to identify intent, which is then used by the NER module 662 to identify frameworks. A framework for an intent of "play" may specify a list of slots or fields applicable to play the identified "object" and any object modifier (e.g., a prepositional phrase), such as {Artist Name}, {Album Name}, {Song name}, etc. The NER module 662 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type or semantic meaning. Parsing may be performed using heuristic grammar rules, or an NER model may be constructed using techniques such as hidden Markov models, maximum entropy models, log linear models, conditional random fields (CRF), and the like.

For instance, a query of "play Man in the Box by Alice in Chains" might be parsed and tagged as {Verb}: "Play," {Object}: "Man in the Box," {Object Preposition}: "by," and {Object Modifier}: "Alice in Chains." At this point in the process, "Play" may be identified as a verb based on a word database associated with the music domain, which the IC module 664 will determine corresponds to the "play music" intent. Even if no determination has been made as to the meaning of "Man in the Box" and "Alice in Chains," but, based on grammar rules and models, it may be determined that the text of these phrases relates to the grammatical objects (i.e., entity) of the query.

The frameworks linked to the intent are then used to determine what database fields should be searched to determine the meaning of these phrases, such as searching a user's gazetteer for similarity with the framework slots. A framework for "play music intent" might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot or field using gazetteer information, the NER module 662 may search the database of generic words associated with the domain (in the storage 673). For example, if a query was "play songs by Heart," after failing to determine an album name or song name called "songs" by "Heart," the NER module 662 may search the domain vocabulary for the word "songs." In the alternative, generic words may be checked before the gazetteer information, or both may be tried, potentially producing two different results.

The comparison process used by the NER module 662 may classify (i.e., score) how closely a database entry compares to a tagged query word or phrase, how closely the grammatical structure of the query corresponds to the applied grammatical framework, and based on whether the database indicates a relationship between an entry and information identified to fill other slots of the framework.

The NER module 662 may also use contextual operational rules to fill slots. For example, if a user had previously requested to pause a particular song and thereafter requested that the voice-controlled device to "please un-pause my music," the NER module 662 may apply an inference-based rule to fill a slot associated with the name of the song that the user currently wishes to play, namely, a song that was playing at the time that the user requested to pause the music.

The results of NLU processing may be tagged to attribute meaning to the query. So, for instance, "play Long Road by Pearl Jam" might produce a result of: {domain} Music, {intent} Play Music, {artist name} "Pearl Jam," {media type} song, and {song title} "Long Road." As another example, "play songs by Pearl Jam" might produce: {domain} Music, {intent} Play Music, {artist name} "Pearl Jam," and {media type} song.

The output from the NLU processing (which may include tagged text, commands, etc.) may then be sent to a command processor 690, which may be located on a same or separate server 620 as part of system 600. The destination command processor 690 may be determined based on the NLU output. For example, if the NLU output includes a command to play music, or to establish a communication session, the destination command processor 690 may be a music application or a communication application, such as one located on device 602 or in another device associated with the user.

Figure 7:
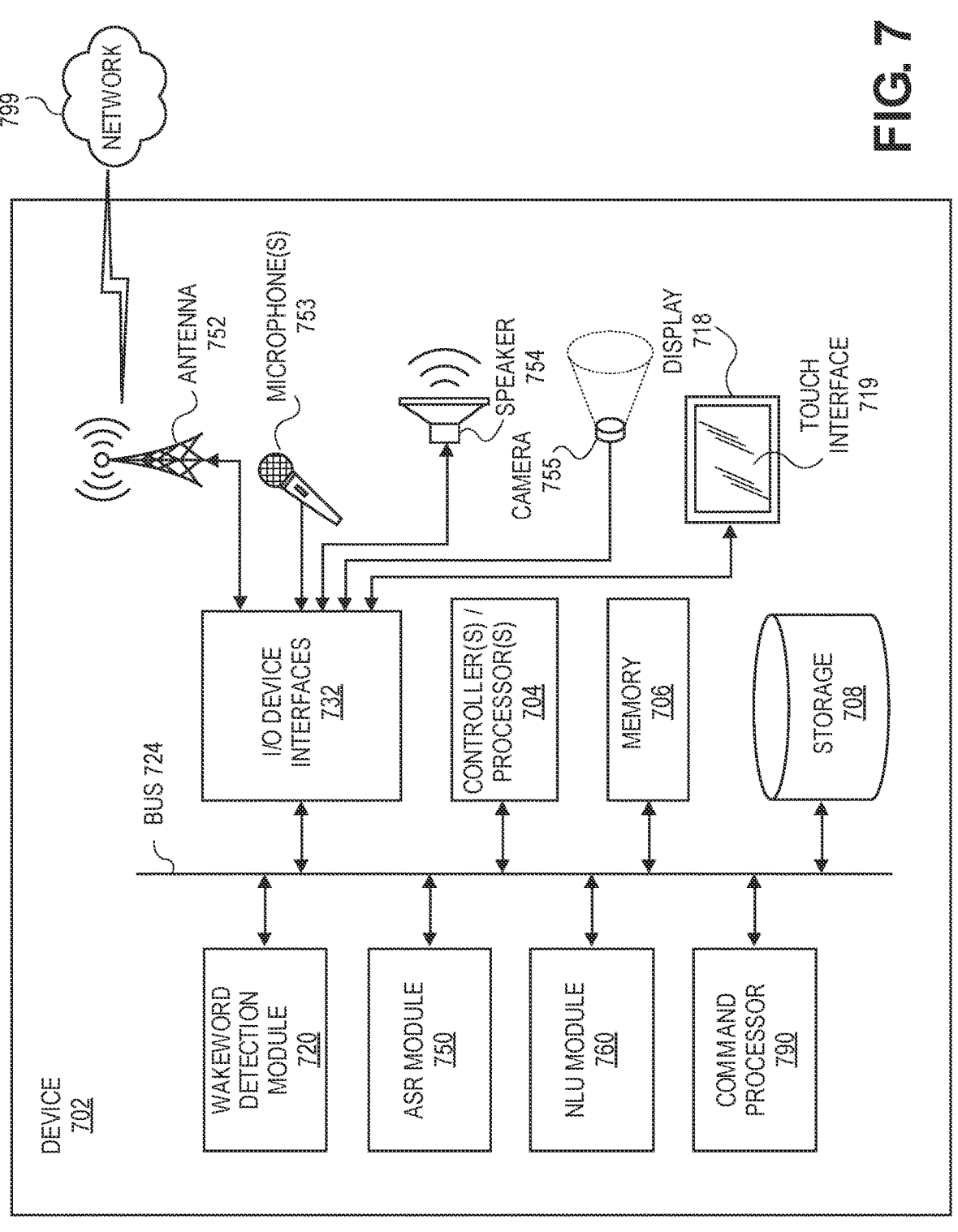
FIG. 7 is a view of aspects of one system for scoring conversational confidence in accordance with implementations of the present disclosure.
Figure 8:
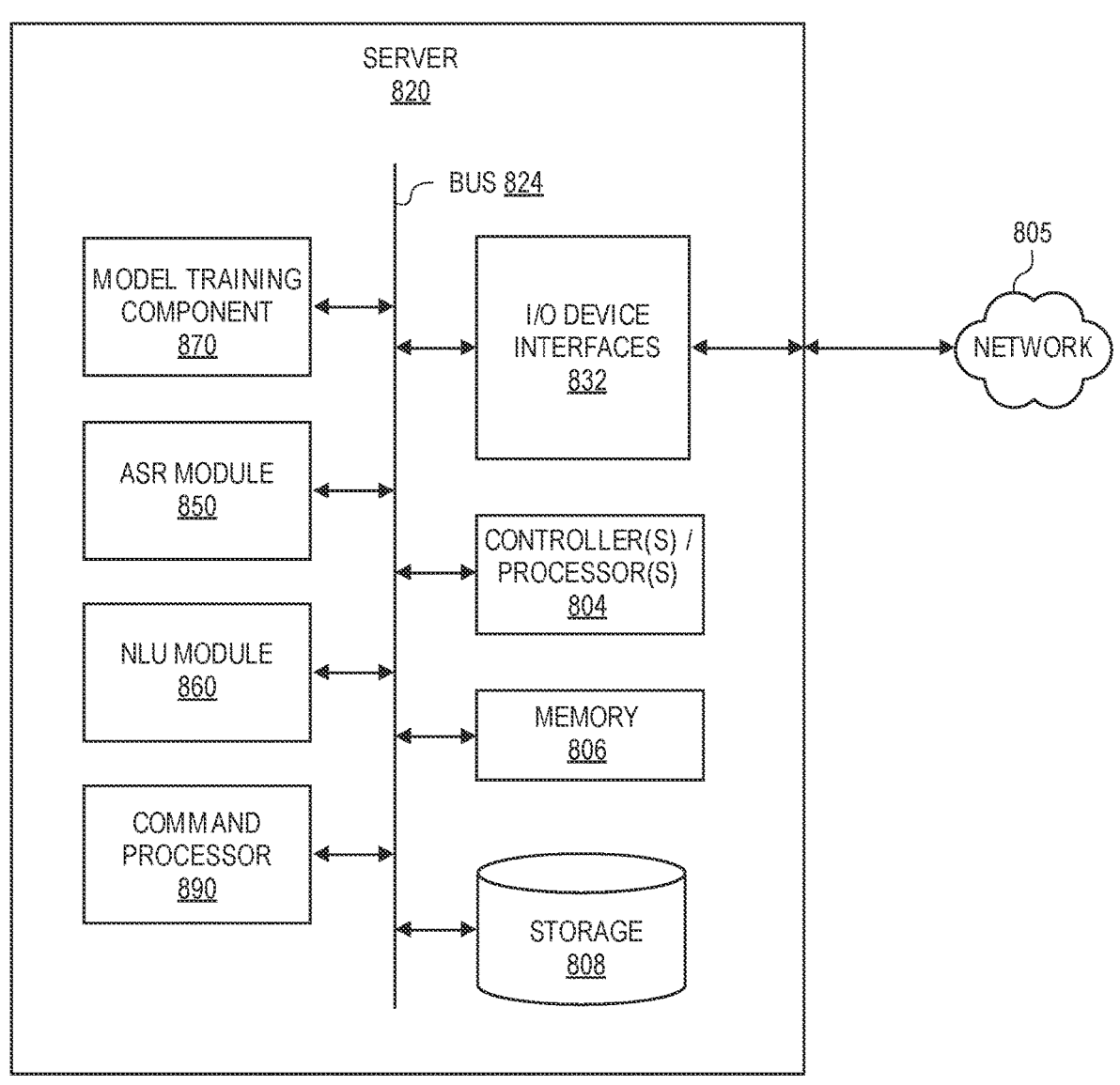
FIG. 8 is a view of aspects of one system for scoring conversational confidence in accordance with implementations of the present disclosure.

FIG. 7 is a block diagram conceptually illustrating a local device 702 that may be used with the described system. FIG. 8 is a block diagram conceptually illustrating example components of a remote device, such as a remote server 820 that may assist with ASR, NLU processing, or command processing. Multiple such servers 820 may be included in the system, such as one server(s) 820 for training ASR models, one server(s) for performing ASR, one server(s) 820 for performing NLU, etc. In operation, each of these devices (or groups of devices) may include computer-readable and computer-executable instructions that reside on the respective device (702/820), as will be discussed further below.

Each of these devices 702/820 may include one or more controllers/processors 704/804, that may each include a central processing unit (or "CPU") for processing data and computer-readable instructions, and a memory 706/806 for storing data and instructions of the respective device. The memories 706/806 may individually include volatile random access memory (RAM), non-volatile read only memory (ROM), non-volatile magnetoresistive (MRAM) and/or other types of memory. Each device may also include a data storage component 708/808, for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces 732/832.

Computer instructions for operating each device 702/820 and its various components may be executed by the respective device's controller(s)/processor(s) 704/804, using the memory 706/806 as temporary "working" storage at runtime. A device's computer instructions may be stored in a non-transitory manner in non-volatile memory 706/806, storage 708/808, or an external device(s). Alternatively, some or all of the executable instructions may be embedded in hardware or firmware on the respective device in addition to or instead of software.

Each device 702/820 includes input/output device interfaces 732/832. A variety of components may be connected through the input/output device interfaces, as will be discussed further below. Additionally, each device 702/820 may include an address/data bus 724/824 for conveying data among components of the respective device. Each component within a device 702/820 may also be directly connected to other components in addition to (or instead of) being connected to other components across the bus 724/824.

Referring to the device 702 of FIG. 7, the device 702 may include a display 718, which may comprise a touch interface 719. Alternatively, the device 702 may be "headless" and may primarily rely on spoken commands for input. As a way of indicating to a user that a connection between another device has been opened, relay constraint notification, etc., the device 702 may be configured with a visual indicator, such as an LED or similar illumination element, that may change color, flash, or otherwise provide visual indications by the device 702. The device 702 may also include input/output device interfaces 732 that connect to a variety of components such as an audio output component such as a speaker 754, an imaging device such as a camera 755, a wired headset or a wireless headset, and/or other components capable of outputting audio. The device 702 may also include an audio capture component. The audio capture component may be, for example, a microphone 753 or array of microphones, a wired headset or a wireless headset, etc. The microphone 753 may be configured to capture audio, such as phrases or utterances from a user. If an array of microphones is included, approximate distance to a sound's point of origin may be determined using, for example, acoustic localization based on time and amplitude differences between sounds captured by different microphones of the array. The device 702 (using microphone 753, wake word detection module 720, ASR module 750, etc.) may be configured to determine audio data corresponding to detected audio data. The device 702 (using input/output device interfaces 732, antenna 752, etc.) may also be configured to transmit the audio data to server 820 for further processing or to process the data using internal components such as a wake word detection module 720.

For example, via the antenna(s), the input/output device interfaces 732 may connect to one or more networks 799/805 via a wireless local area network (WLAN) (such as Wi-Fi) radio, Bluetooth, and/or wireless network radio, such as a radio capable of communication with a wireless communication network such as a Long-Term Evolution (LTE)

network, WiMAX network, 3G network, 5G network, etc. A wired connection such as Ethernet may also be supported. Through the network(s) 799/805, the speech processing system may be distributed across a networked environment.

The device 702 and/or server 820 may include an ASR module 750/850. The ASR module 750 in device 702 may be of limited or extended capabilities or may not be included in the device 702. The ASR module(s) may include the language models stored in the ASR model storage component, and perform the automatic speech recognition process. If limited speech recognition is included on the device 702, the ASR module 750 may be configured to identify a limited number of words, such as keywords detected by the device, whereas extended speech recognition may be configured to recognize a much larger range of words.

The device 702 and/or server 820 may include a limited or extended NLU module 760/860. The NLU module in device 702 may be of limited or extended capabilities, or may not be included on the device 702. The NLU module(s) may comprise the name entity recognition module, the intent classification module and/or other components, as discussed above. The NLU module(s) may also include a stored knowledge base and/or entity library, or those storages may be separately located.

The device 702 and/or server 820 may also include a command processor 790/890 that is configured to execute commands/functions associated with a spoken command as described above.

The device 702 may include a wake word detection module 720, which may be a separate component or may be included in an ASR module 750. The wake word detection module 720 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some implementations, the device 702 may be configured collectively to identify a set of the directional audio signals in which the wake expression is detected or in which the wake expression is likely to have occurred.

The wake word detection module 720 receives captured audio and processes the audio to determine whether the audio corresponds to particular keywords recognizable by the device 702 and/or system. The storage 708 may store data relating to keywords and functions to enable the wake word detection module 720 to perform the algorithms and methods described above. The locally stored speech models may be pre-configured based on known information, prior to the device 702 being configured to access the network by the user. For example, the models may be language and/or accent specific to a region where the user device is shipped or predicted to be located, or to the user himself/herself, based on a user profile, etc. In an aspect, the models may be pre-trained using speech or audio data of the user from another device. For example, the user may own another user device that the user operates via spoken commands, and this speech data may be associated with a user profile. The speech data from the other user device may then be leveraged and used to train the locally stored speech models of the device 702 prior to the user device 702 being delivered to the user or configured to access the network by the user. The wake word detection module 720 may access the storage 708 and compare the captured audio to the stored models and audio sequences using audio comparison, pattern recognition, keyword spotting, audio signature, and/or other audio processing techniques.

The server may include a model training component 870. The model training component may be used to train the classifiers or models discussed above.

As noted above, multiple devices may be employed in a single speech processing system. In such a multi-device system, each of the devices may include different components for performing different aspects of the speech processing. The multiple devices may include overlapping components. The components of the devices 702 and server 820, as illustrated in FIGS. 7 and 8, are exemplary, and may be located as a stand-alone device or may be included, in whole or in part, as a component of a larger device or system.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the process represented in the flow chart of FIG. 3, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A method, comprising:

receiving, by a first computer system from a second computer system, first data corresponding to at least a first utterance, wherein the first data is derived at least in part from a first audio signal of a user captured by the second computer system;

determining, by the first computer system, that the first utterance comprises a first invocation to initiate a first conversation;

identifying, by the first computer system, a first set of input features, wherein each of the first set of input features relates to at least one of the user, the first utterance or the second computer system;

calculating, by the first computer system, a first confidence score based at least in part on the first set of input features;

in response to determining that the first data includes an affirmative response, increasing a pitch used in a default tone for use as a first tone;

in response to determining that the first data includes a negative response, decreasing the pitch used in the default tone for use as the first tone;

selecting, by the first computer system based at least in part on the first confidence score, at least the first tone of a first dialog act;

generating, by the first computer system, second data for audible presentation of the first dialog act to the user in response to the first data; and transmitting, by the first computer system, the second data using at least the first tone as an audible response to the second computer system.

2. The method of claim 1, further comprising:

receiving, by the first computer system from the second computer system, third data corresponding to at least a second utterance, wherein the third data is derived at least in part from a second audio signal of the user captured by the second computer system;

identifying, by the first computer system, a second set of input features, wherein each of the second set of input features relates to at least one of the user, the second utterance or the second computer system;

calculating, by the first computer system, a second confidence score based at least in part on the second set of input features;

selecting, by the first computer system based at least in part on the second confidence score, a second tone of a second dialog act, the second tone having a different pitch than the first tone;

generating, by the first computer system, fourth data for audible presentation of the second dialog act to the user; and transmitting, by the first computer system, the fourth data using the second tone as another audible response to the second computer system.

3. The method of claim 1, further comprising:

identifying a trajectory of the conversation based at least in part on the first confidence score and at least one prior confidence score; and wherein the first tone is selected based at least in part on the trajectory of the conversation.

4. The method of claim 1, wherein the tone is selected to sonically emulate at least one of:

excitement;

optimism;

curiousness; or interest.

5. The method of claim 1, further comprising:

creating a visual presentation for the second computer system that includes at least one of:

a display of one or more lights under control of the second computing system; or display of imagery associated with the tone.

6. The method of claim 1, further comprising:

determining a plurality of candidates for the second data; and selecting a candidate from the plurality of candidates based at least in part on a number of words included in the candidate.

7. The method of claim 1, further comprising:

selecting, by the first computer system, a second tone of a first dialog act; and wherein the transmitting, by the first computer system, the second data includes applying the first tone for a first portion of the second data and applying the second tone for the second portion of the second data to create the audible response to the second computer system.

8. A computer-implemented method, comprising:

receiving first data representing a request of a user;

analyzing the request to determine features associated with at least one of the user or words included in the request;

generating second data as a response to the request, the second data based at least in part on the features;

selecting, for audio playback of the second data, a first tone from a plurality of available tones based at least in part on the features, wherein the selecting the first tone includes at least one of:

selecting the first tone to have a lower pitch than a standard tone in response to the second data including a negative context; and selecting the first tone to have a higher pitch than the standard tone in response to the second data including a positive context;

generating first audio that includes the second data sonically produced at least in part using the first tone; and sending the first audio to the user.

9. The computer-implemented method of claim 8, further comprising:

selecting, for audio playback of additional data, a second tone from the plurality of available tones;

generating second audio that includes the additional data sonically produced using the second tone; and sending the second audio to the user.

10. The computer-implemented method of claim 8, further comprising:

selecting a visual presentation for presentation to the user with the first audio, the visual presentation selected based at least in part on the features; and sending the visual presentation to the user for playback with the first audio.

11. The computer-implemented method of claim 10, wherein the visual presentation includes instructions to control of one or more lights included in a user device that plays the first audio.

12. The computer-implemented method of claim 8, further comprising:

selecting a second tone from the plurality of available tones based at least in part on the features; and wherein the generating the first audio includes generating at least a portion of the second data sonically produced using the second tone.

13. The computer-implemented method of claim 8, further comprising:

sending the features to a model; and receiving, from the model, one or more confidence scores indicating a level of confidence that the request can be satisfied for the user; and wherein the selecting the first tone is based at least in part on the one or more confidence scores.

14. The computer-implemented method of claim 8, further comprising:

selecting, for audio playback of a portion of the second data, a second tone from the plurality of available tones based at least in part on the features; and generating the first audio to further include the portion of the second data sonically produced at least in part using the second tone.

15. A computer system comprising:

one or more processors; and memory storing one or more sets of instructions that, when executed by the one or more processors, cause the computer system to at least:

receive first data representing a request of a user;

analyze the request to determine features associated with at least one of the user or words included in the request;

generate second data as a response to the request, the second data based at least in part on the features;

select, for audio playback of the second data, a first tone from a plurality of available tones based at least in part on the features, wherein selection of the first tone includes at least one of:

selection of the first tone to have a lower pitch than a standard tone in response to the second data including a negative context; and selection of the first tone to have a higher pitch than the standard tone in response to the second data including a positive context;

generate first audio that includes the second data sonically produced at least in part using the first tone; and send the first audio to the user.

16. The computer system of claim 15, wherein the one or more sets of instructions, when executed by the one or more processors, further cause the computer system to at least:

select, for audio playback of additional data, a second tone from the plurality of available tones;

generate second audio that includes the additional data sonically produced using the second tone; and send the second audio to the user.

17. The computer system of claim 15, wherein the one or more sets of instructions, when executed by the one or more processors, further cause the computer system to at least:

select a visual presentation for presentation to the user with the first audio, the visual presentation selected based at least in part on the features; and send the visual presentation to the user for playback with the first audio.

18. The computer system of claim 15, wherein the visual presentation includes instructions to control one or more lights included in a user device that plays the first audio.

19. The computer system of claim 15, wherein the one or more sets of instructions, when executed by the one or more processors, further cause the computer system to at least:

select a second tone from the plurality of available tones based at least in part on the features; and wherein generation of the first audio includes generation of at least a portion of the second data sonically produced using the second tone.

20. The computer system of claim 15, wherein the one or more sets of instructions, when executed by the one or more processors, further cause the computer system to at least:

select, for audio playback of a portion of the second data, a second tone from the plurality of available tones based at least in part on the features; and generate the first audio to further include the portion of the second data sonically produced at least in part using the second tone.

\* \* \* \* \*